US012736788B2

(12) United States Patent
Huang

(10) Patent No.: US 12,736,788 B2
(45) Date of Patent: Sep. 15, 2026

(54) PROJECTION SYSTEM AND ILLUMINATION DEVICE

(71) Applicant: TRIPLE WIN TECHNOLOGY(SHENZHEN) CO.LTD., Shenzhen (CN)

(72) Inventor: Gwo-Yan Huang, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 262 days.

(21) Appl. No.: 18/754,213

(22) Filed: Jun. 26, 2024

(65) Prior Publication Data

US 2025/0199276 A1 Jun. 19, 2025

(30) Foreign Application Priority Data

Dec. 15, 2023 (CN) ......................... 202311732699.6

(51) Int. Cl.
*G02B 13/16* (2006.01)
*G02B 9/16* (2006.01)
*G02B 13/18* (2006.01)

(52) U.S. Cl.
CPC ............... *G02B 13/16* (2013.01); *G02B 9/16* (2013.01); *G02B 13/18* (2013.01)

(58) Field of Classification Search
CPC ... G02B 9/12; G02B 9/14; G02B 9/16; G02B 9/18; G02B 9/20; G02B 9/22; G02B 9/24; G02B 9/26; G02B 9/28; G02B 9/30; G02B 9/32; G02B 9/34; G02B 9/36; G02B 13/00–26; H04N 9/31–3197; G03B 21/00–64; B60K 35/00–90
USPC .................................................. 359/716, 785
See application file for complete search history.

(56) References Cited

U.S. PATENT DOCUMENTS

2013/0169707 A1* 7/2013 Li ............................ G02B 9/34 359/650
2022/0229270 A1* 7/2022 Jiang ........................ G02B 9/34

* cited by examiner

*Primary Examiner* — Christopher A Lamb, II
(74) *Attorney, Agent, or Firm* — ScienBiziP, P.C.

(57) ABSTRACT

A projection system includes a first lens, a second lens, and a third lens arranged in sequence from a projection surface to an image source surface. The projection system satisfies expressions below:

$$10° < DFOV < 14°; CRA < 0.52°; 4.2 < TR < 5.9; 0.29 < f1/f23 < 0.75;$$

$$0.67 < f3/f12 < 1.73; 12 < OTL/IH < 15; \text{and } 1.1 < CT3/ET3 < 1.3.$$

Wherein: DFOV is a maximal field-of-view angle of the projection system; CRA is a chief ray angle; TR is a throw ratio; f1 is a focal length of the first lens; f23 is a combined focal length of the second lens and the third lens; f3 is a focal length of the third lens; f12 is a combined focal length of the second lens and the first lens; OTL is an optical total length; IH is a maximum image height on the image source surface; CT3 is a center thickness of the third lens; ET3 is an edge thickness of the third lens. An illumination device is further disclosed.

20 Claims, 23 Drawing Sheets

IMA:0.000MM

IMA:1.319MM

IMA:2.639MM

IMA:3.958MM

IMA:5.278MM

IMA:6.597MM

PROJECTION SYSTEM AND ILLUMINATION DEVICE

FIELD

The subject matter herein relates to projection systems, and illumination devices.

BACKGROUND

Existing illumination devices, especially applied in vehicles, often incorporate projection functions to convey information to the user. For example, vehicle headlamps can project road conditions, navigation information, warning messages, and more by adding a projection system. However, conventional projection systems typically include multiple spherical glass lenses, resulting in a high number of lenses overall. This, in turn, leads to larger overall system size and higher costs.

Therefore, there is room for improvement within the art.

BRIEF DESCRIPTION OF THE DRAWINGS

Implementations of the present disclosure will now be described, by way of embodiment, with reference to the attached figures, wherein.

DETAILED DESCRIPTION

Figure 1:
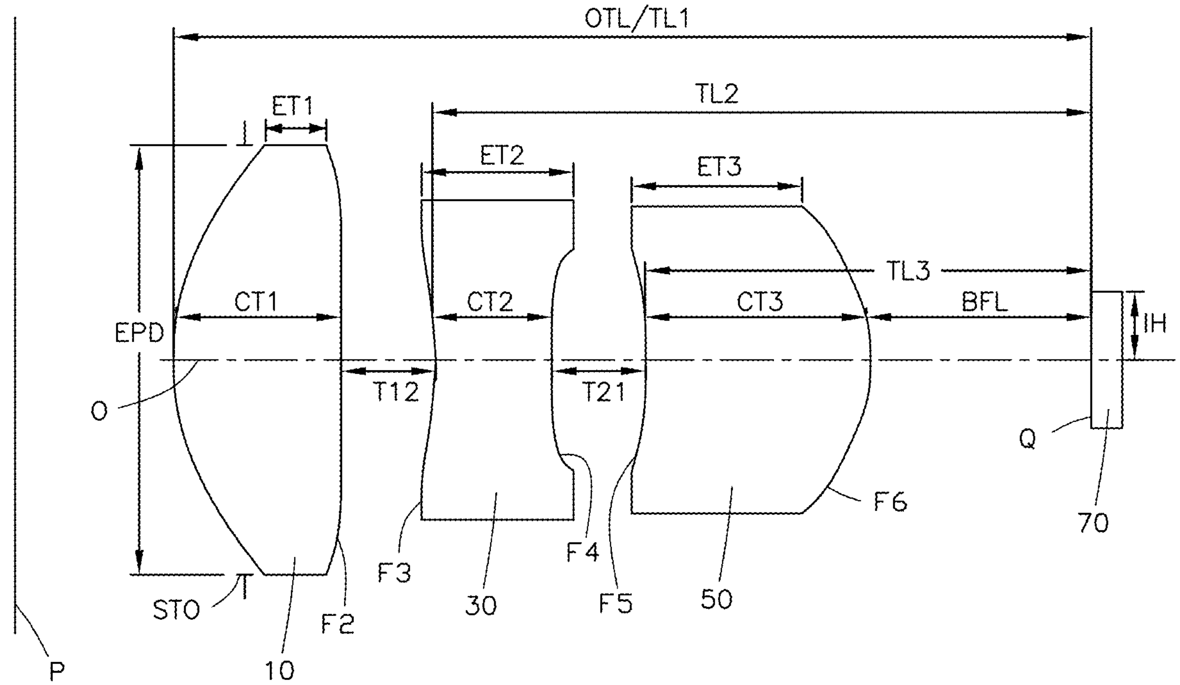
FIG. 1 illustrates a projection system according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

"Optional" or "optionally" means that the subsequently described circumstance may or may not occur, so that the description includes instances where the circumstance occurs and instances where it does not.

"Above" means one layer is located on top of another layer. In one example, it means one layer is situated directly on top of another layer. In another example, it means one layer is situated over the second layer with more layers or spacers in between.

When a feature or element is herein referred to as being "on" another feature or element, it can be directly on the other feature or element or intervening features and/or elements may also be present. It will also be understood that, when a feature or element is referred to as being "connected", "attached" or "coupled" to another feature or element, it can be directly connected, attached or coupled to the other feature or element or intervening features or elements may be present.

FIG. 1 illustrates a projection system 100 according to an embodiment of the present disclosure. The projection system 100 includes a first lens 10, a second lens 30, and a third lens 50, sequentially arranged from a projection surface P to an image source surface Q. The projection system 100 satisfies the following conditions: 10°<DFOV<14°; CRA<0.52°; 4.2<TR<5.9; 0.29<f1/f23<0.75; 0.67<f3/f12<1.73; 12<OTL/IH<15; and 1.1<CT3/ET3<1.3; wherein, DFOV is a maximal field-of-view angle of the projection system 100; CRA is a chief ray angle of the projection system 100; TR is a throw ratio of the projection system 100; f1 is a focal length of the first lens 10; f23 is a combined focal length of the second lens 30 and the third lens 50; f3 is a focal length of the third lens 50; f12 is a combined focal length of the second lens 30 and the first lens 10; OTL is a total optical length of the projection system 100; IH is a maximum image height at the image source surface Q of the projection system 100; CT3 is a center thickness of the third lens 50; ET3 is an edge thickness of the third lens 50.

Specifically, the projection system 100 is used to project light emitted from the image source surface Q onto the projection surface P. The light emits from the image source surface Q sequentially passes through the third lens 50, the second lens 30, and the first lens 10 and reaches the projection surface P.

In this embodiment, the field-of-view angle specifically refers to a diagonal field of view angle (DFOV), which indicates a maximum field of view range that the projection system 100 can project. Specifically, the field-of-view angle is an angle formed by the two edges of the maximum range of light that can be emitted from the image source surface through the projection system 100. The size of the DFOV value determines a range of a projected image on the projection surface P. The larger the field-of-view angle, the larger the image on the same projection surface. By setting the field-of-view angle range to 10°<DFOV<14°, the projected image can be projected to a further range, which is conducive to applying the projection system 100 to scenes requiring long-distance projection, such as car headlamps and projection lamps.

The chief ray angle (CRA) specifically refers to an angle between the chief ray of a certain field of view of the projection system 100 and a normal of the image source surface. The chief ray is specifically a ray that is emitted from a certain field point on the image source surface and passes through a pupil center of the projection system 100. The CRA can affect a quality of light at the edge positions. By setting the CRA<0.52°, it is beneficial to improving a clarity of the image on the projection surface P.

The throw ratio (TR) specifically refers to a ratio between a projection distance and an image width of the projection system 100. The projection distance is a distance between the projection system 100 and the projection surface P, and the image width is a width of the image formed on the projection surface P by the light emitted from the projection system 100. On the same projection surface P, the larger the throw ratio, the smaller the image; the smaller the throw ratio, the larger the image. By setting the throw ratio to 4.2<TR<5.9, the light emitted from the projection system 100 can be more concentrated, which is conducive to projecting images at long distances, making the projection system 100 better applicable to scenarios requiring long-distance projection, such as car headlamps and projection lamps.

The first lens 10 has positive optical power, the second lens 30 has negative optical power, and the third lens 50 has positive optical power. Specifically, optical power is a difference between a convergence of light on an image side and an object side, the optical power can characterize abilities of optical systems to deflect light. Generally, convex lenses have positive optical power, and concave lenses have negative optical power. That is, the first lens 10 and the third lens 50 are convex lenses, and the second lens 30 is a concave lens. By setting the optical power of the first lens 10, the second lens 30, and the third lens 50 in the projection system 100, it is conducive to a smooth transition of the light path and enhances the quality of the projected image of the projection system 100.

The projection system 100 also satisfies: 0.66<f/OTL<0.76; 1.46<f/f1<1.92; 0.63<f/f3<1.27. Wherein, f is a combined focal length of the first lens 10, the second lens 30, and the third lens 50. The OTL specifically refers to a distance from the image source surface Q to a surface of the first lens 10 on a side away from the image source surface Q. By setting the focal lengths of the first lens 10, the second lens 30, and the third lens 50, as well as the relationships between the combined focal lengths of multiple lenses, enables the projection system 100 to be better applied in scenarios requiring long-distance projection, such as car headlights and projection lamps.

The first lens 10, the second lens 30, and the third lens 50 are all aspherical lenses symmetric along an optical axis O. Specifically, aspherical lenses play an important role in optical systems, mainly used to focus incident light and improve a numerical aperture of the lens. At the same time, using aspherical lenses can also reduce numbers of optical elements required in the optical system. For example, one or two aspherical lenses can replace five or six spherical lenses, achieving the same or even better optical effects, thereby reducing design and production costs and reducing the size of the lens. In addition, using aspherical lenses can also correct spherical aberration, thereby reducing the aberration of the optical system and ultimately improving the quality of the optical system. By setting the first lens 10, the second lens 30, and the third lens 50 all as aspherical lenses, multiple spherical lenses can be replaced, thereby reducing the size of the projection system 100 and improving space utilization.

A characteristic of an aspheric lens is that radius of curvature of lens surface varies from the center (the position of the optical axis O) to the edge. Specifically, the surface of an aspheric lens is shaped by a curve constituted by aspheric coefficients. In this embodiment, the aspheric equations of the first lens 10, the second lens 30, and the third lens 50 satisfy:

$$Z = \frac{cr^2}{1 + \sqrt{1 - (1 + K)c^2r^2}} + A_4r^4 + A_6r^6 + A_8r^8 + A_{10}r^{10} + A_{12}r^{12} + A_{14}r^{14} + A_{16}r^{16}.$$

Wherein, Z is a relative distance along the optical axis O between a point on the aspheric surface at a distance r from the optical axis O and the intersection of the aspheric surface with the optical axis O. r is a perpendicular distance from any point on the aspheric surface to the optical axis O. c is a curvature (a reciprocal of the radius of curvature) at the intersection of the aspheric surface with the optical axis O. K is a conic constant. $A_i$ is the i-th correction coefficient of the aspheric surface (i=4, 6, 8, 10, 12, 14, 16). The above formula can be used to represent an object-side surface F1 of the first lens 10, an image-side surface F2 of the first lens 10, an object-side surface F3 of the second lens 30, an image-side surface F4 of the second lens, an object-side surface F5 of the third lens 50, and an image-side surface F6 of the third lens 50. In other embodiments, the aspheric surfaces of the first lens 10, the second lens 30, and the third lens 50 can also be represented using other aspheric formulas.

A ratio of the center thickness to the edge thickness of lenses helps the lenses to have appropriate formability and homogeneity. By setting the ratio of the center thickness CT3 to the edge thickness ET3 of the third lens 50 to satisfy: 1.1<CT3/ET3<1.3, which is beneficial for the molding of the third lens 50, thereby improving a yield of the projection system 100.

Materials of the first lens 10, the second lens 30, and the third lens 50 can be transparent materials such as glass or plastic.

The projection system 100 also includes a display module 70. The display module 70 is arranged at the image source surface Q, and a distance from a center position to an edge position of the display module 70 is equal to the maximum image height IH of the projection system 100. Specifically, a surface of the display module 70 that emits image light coincides with the image source surface Q. The display module 70 can be, for example, a Digital Micro-mirror Device (DMD) display device, a Liquid Crystal on Silicon (LCOS) display device, a Liquid Crystal Display (LCD) device, a micro-LED display, a mini-LED display, an organic LED display, which is not limited in the present disclosure.

The relationship between the optical total length OTL and the maximum image height IH satisfying 12<OTL/IH<15 is beneficial to optimizing the space utilization of the projection system 100 to the maximum extent, and allows the projection system 100 to be used in scenarios requiring long-distance projection, such as automotive headlamps and projection lamps.

In this embodiment, the projection system 100 also includes an aperture STO, which is arranged on a side of the first lens 10 away from the second lens 30. Specifically, the aperture STO is used to determine an entrance pupil diameter (EPD) of the projection system 100 and can be used to modulate a light flux emitted from the image source surface Q, thereby modulating a brightness and clarity of the projection image on the projection surface P. In other embodiments, the projection system 100 may not include the aperture STO, and the EPD of the projection system 100 is determined by the aperture of the first lens 10.

An F-number (Fno) of the projection system 100 satisfies: 1.1<Fno<1.7. Specifically, the F-number Fno of the projection system 100 is equal to a ratio of the effective focal length (EFL) of the projection system 100 to an entrance pupil diameter EPD, that is, Fno=EFL/EPD.

An optical distortion of the projection system 100 satisfies: 0.0%<Distortion<0.4%. Specifically, optical distortion refers to the degree of distortion of the image projected on the projection surface P compared to the image source surface Q, which is a type of aberration caused by lens defects. Due to the influence of diaphragm spherical aberration, a height of the intersection point of the chief rays of different fields of view with the Gaussian image plane (the ideal image plane determined by Gaussian optics) is not equal to the ideal image height, and the difference between the height of the intersection point and the ideal image height is the distortion. Distortion changes an imaging position of off-axis object points on the ideal plane, affecting magnification of different fields of view on the image plane, resulting in distortion of the image shape but not affecting the clarity of the image. Unequal local magnification can cause image plane distortion, which includes positive distortion and negative distortion. The positive distortion refers to a greater magnification at the edges of an object than at the center, while negative distortion refers to a smaller magnification at the edges than at the center. By setting the parameters of each element such that the overall optical distortion of the projection system 100 satisfies: 0.0%<Distortion<0.4%, which improves the quality of the projected image and enhances the user experience.

A relative illumination (RIL) of the projection system 100 satisfies: RIL>96%. Specifically, illuminance refers to the brightness of the light presented on a surface of an object or an illuminated surface by a light source. Relative illumination RIL is a ratio of the illuminance at different coordinate points on the projection surface P to an illuminance at the center point. If the relative illumination RIL is insufficient, the illuminance of the image on the projection surface P will be uneven, which can easily lead to some areas being too dim or too bright, resulting in the image center being brighter than the surroundings, commonly known as vignetting. Additionally, insufficient relative illumination RIL may also lead to color distortion. More specifically, relative illumination RIL is negatively correlated with the field of view angle. By setting a small field of view angle DFOV, enabling the projection system 100 to have high relative illumination RIL.

The following describes the projection system 100 provided by this embodiment in detail with reference to specific embodiments.

Figure 2:
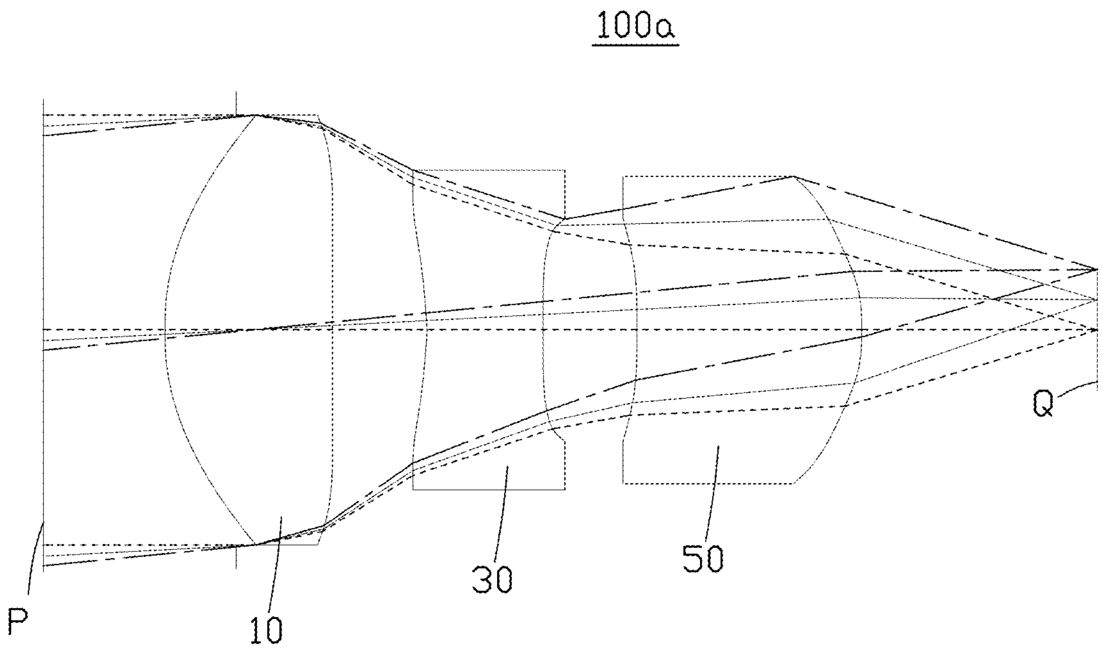
FIG. 2 illustrates a first embodiment of an optical path of a projection system according to the present disclosure.

FIG. 2 illustrates a projection system 100*a* according to a first embodiment of the present disclosure.

Table. 1 shows basic parameters of the projection system 100*a* of the first embodiment.

Table. 1 Parameters of the projection system 100a.

| | |
|---|---|
| IH | 6.597 mm |
| OTL | 98.276 mm |
| BFL | 23.958 mm |
| TL1 | 98.276 mm |
| TL2 | 70.273 mm |
| TL3 | 47.772 mm |
| T12 | 10.001 mm |
| T23 | 10.001 mm |
| N1 | 1.54 |
| N2 | 1.66 |
| N3 | 1.54 |
| V1 | 56.1 |
| V2 | 20.4 |
| V3 | 56.1 |
| EPD | 45 mm |
| f | 75.020 mm |
| Fno | 1.67 |
| FOV | 10° |
| CRA | CRA < 0.502° |
| Distortion | 0.0% < Distortion < 0.4% |
| RIL | RIL > 96% |
| f1 | 51.249 mm |
| f2 | −81.004 mm |
| f3 | 58.857 mm |
| 1/f1 | 0.020 |
| f12 | 86.818 mm |
| f23 | 68.984 mm |
| f3/f12 | 0.678 |
| f1/f23 | 0.743 |
| OTL/IH | 14.897 |
| CT1 | 18.002 mm |
| ET1 | 7.928 mm |
| CT1/ET1 | 2.271 |
| CT2 | 12.501 mm |
| ET2 | 15.963 mm |
| CT2/ET2 | 0.783 |

-continued

| Table. 1 Parameters of the projection system 100a. | |
|---|---|
| CT3 | 23.814 mm |
| ET3 | 19.049 mm |
| CT3/ET3 | 1.250 |
| TR | 5.89 |

Wherein, BFL is back focus length of the projection system 100, TL1 is a distance between an optical side center of the first lens 10 and the image source surface Q, TL2 is a distance between an optical side center of the second lens 30 and the image source surface Q, TL3 is a distance between an optical side center of the third lens 50 and the image source surface Q, T12 is a distance between the first lens 10 and the second lens 30, T23 is a distance between the second lens 30 and the third lens 50, N is a refractive index of the first lens 10, N2 is a refractive index of the second lens 30, N3 is a refractive index of the third lens 50, V is an abbe number of the first lens 10, V2 is an abbe number of the second lens 30, V3 is an abbe number of the third lens 50, CT1 is a center thickness of the first lens 10; ET1 is an edge thickness of the first lens 10, CT2 is a center thickness of the second lens 30; ET2 is an edge thickness of the second lens 30.

Table. 2 shows parameters of surfaces of different elements of the projection system 100*a* of the first embodiment.

| Surface number | Elements | Surface Type | Radius of curvature | Thickness | Refractive index | Abbe number | semidiameter |
|---|---|---|---|---|---|---|---|
| Projection surface | | standard surface | infinite | infinite | | | infinite |
| | | standard surface | infinite | 20.000 | | | 24.252 |
| STO | aperture | standard surface | infinite | −7.590 | | | 22.500 |
| F1 | First lens | aspheric | 26.692 | 18.002 | 1.54 | 56.1 | 22.675 |
| F2 | 10 | aspheric | 441.937 | 10.001 | | | 21.793 |
| F3 | Second | aspheric | −33.018 | 12.501 | 1.66 | 20.4 | 16.719 |
| F4 | lens 30 | aspheric | −97.743 | 10.001 | | | 11.539 |
| F5 | Third | aspheric | −30.933 | 23.814 | 1.54 | 56.1 | 12.851 |
| F6 | lens 50 | aspheric | −20.046 | 23.958 | | | 15.613 |
| Image source surface | | standard surface | infinite | 0 | | | 6.597 |

Table. 3 is coefficient of the aspheric surfaces of the first lens 10, the second lens 30 and the third lens 50 of the projection system 100*a* of the first embodiment.

| Surface | K | $A_4$ | $A_6$ | $A_8$ |
|---|---|---|---|---|
| F1 | −0.516 | 1.5074E−07 | −5.0737E−10 | −1.9293E−12 |
| F2 | −82.558 | −8.3143E−06 | −2.4540E−09 | 5.0963E−12 |
| F3 | −12.806 | 8.2730E−06 | 3.7987E−08 | −2.9715E−11 |
| F4 | −77.068 | 9.4709E−05 | −4.0128E−08 | 1.6038E−09 |
| F5 | −15.088 | −3.4021E−06 | −2.3666E−08 | 2.4184E−10 |
| F6 | −0.158 | 1.8358E−05 | −7.1440E−08 | 1.6733E−10 |

| Surface | $A_{10}$ | $A_{12}$ | $A_{14}$ | $A_{16}$ |
|---|---|---|---|---|
| F1 | −3.2036E−14 | 3.1054E−17 | 2.4030E−20 | −1.1544E−22 |
| F2 | 9.3403E−15 | −1.7687E−17 | −9.9691E−20 | 1.2175E−22 |
| F3 | −7.1237E−14 | 3.1631E−17 | −1.0565E−19 | 1.2249E−21 |
| F4 | 5.2309E−12 | −6.8473E−16 | −3.4183E−16 | 3.7892E−18 |
| F5 | 6.8395E−12 | −1.9377E−14 | −2.1269E−16 | 9.3036E−19 |
| F6 | 1.8269E−12 | −1.2938E−14 | 2.7968E−17 | −1.2568E−20 |

Figure 3:
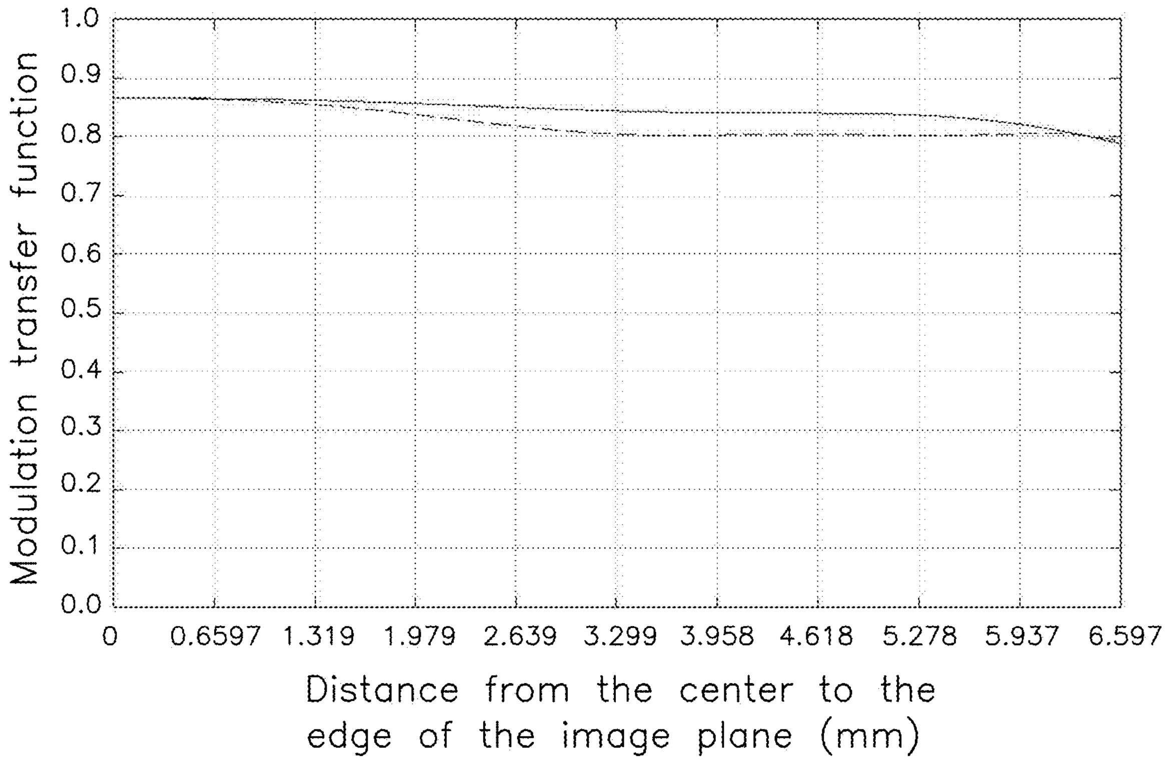
FIG. 3 is a modulation transfer function (MTF) chart of the projection system of the first embodiment.

As FIG. 3 shows, the MTF test chart for light with wavelengths from 470 nm to 650 nm after passing through the projection system 100*a* in the first embodiment shows that the MTF values of the projection system 100*a* are generally greater than 0.8, indicating high resolution.

Specifically, the light distribution of any optical image can be regarded as a linear combination of numerous spatial frequency sine wave distributions. The modulation of the sine distribution is a ratio of its amplitude to the average value. The function that describes the modulation variation with spatial frequency is called the modulation transfer function, which is a function of spatial frequency that reflects the optical system's ability to transmit various frequency sine modulations. The MTF curve is an important metric for evaluating lens performance, serving as a method to assess the capability of reproducing fine details of the object being measured. The MTF curve comprehensively and objectively characterizes the sharpness of the imaging. The information provided by the MTF curve includes resolution and contrast from the center to the edge of the lens, as well as the degree of field curvature. The horizontal axis in the graph represents the distance (mm) from the center to the edge of the image plane, with "0" indicating the center of the image plane. The vertical axis represents the modulus of the optical transfer function, which reflects the values of contrast and resolution, ranging from 0 to 1. The closer the vertical axis value is to 1, the closer the contrast and resolution are to 100%, indicating better lens imaging performance. Generally, in an MTF curve, a vertical axis value greater than 0.9 is considered excellent, and 0.7 to 0.9 is considered good. The spatial frequency unit for MTF curves can be expressed in cycles per millimeter (cyc/mm). In the MTF tests of the first embodiment, the spatial frequency used is 12.5 cyc/mm.

Figure 4:
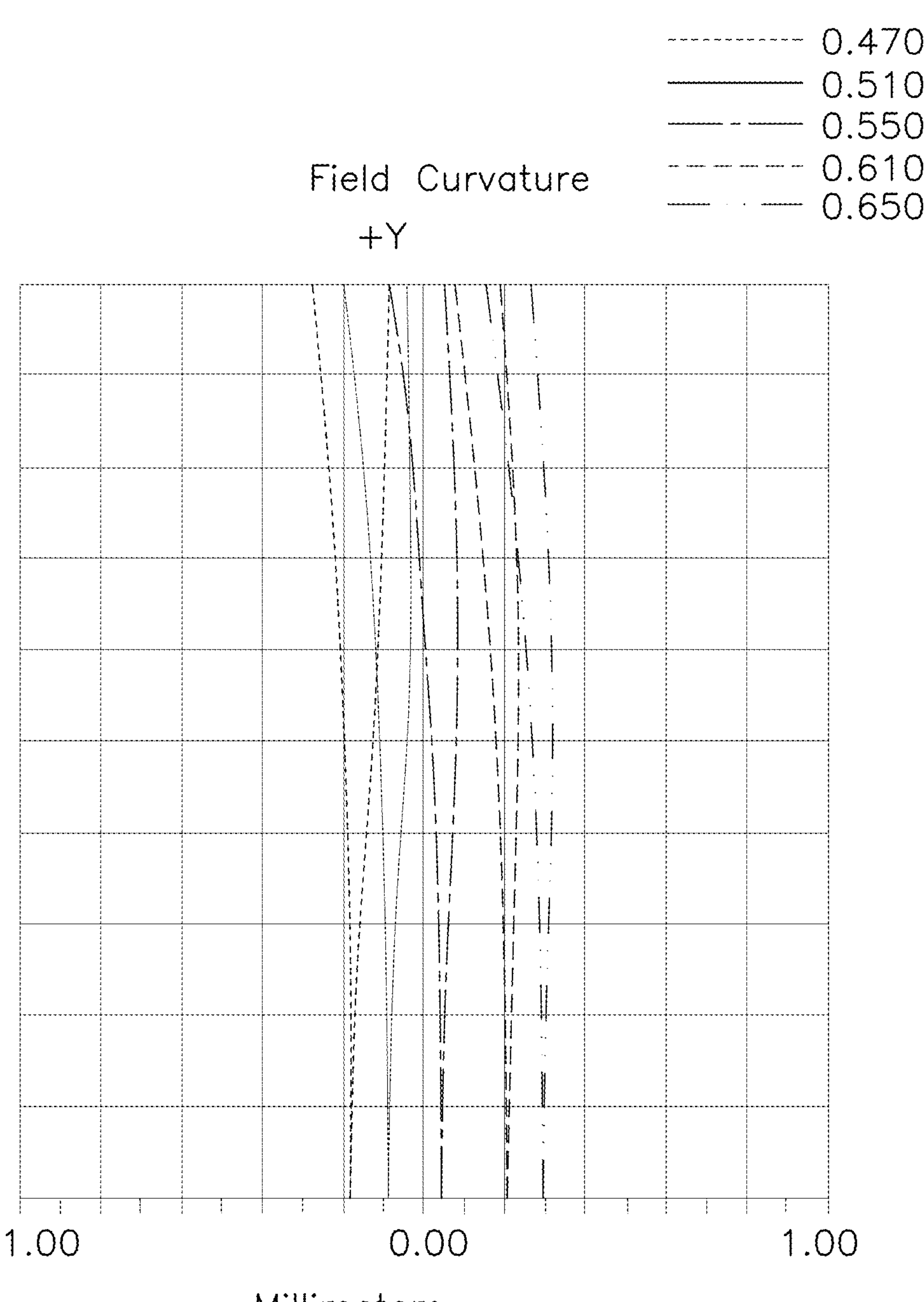
FIG. 4 is a field curvature chart of the projection system of the first embodiment.

Referring to FIG. 4, a field curvature chart for light with wavelengths of 470 nm, 510 nm, 555 nm, 610 nm, and 650 nm show that, at a maximum field of view of 5.006°, the field curvature for these five wavelengths is less than 0.3 mm. Specifically, field curvature is a type of aberration caused by lens imperfections, where the optimal focus plane for light emanating from a plane perpendicular to the optical axis O is not a flat plane but a curved surface. Therefore, when the preset image plane is flat, some light does not focus on the preset image plane. The projection system 100*a* provided in this first embodiment has low field curvature, resulting in better image quality.

Figure 5:
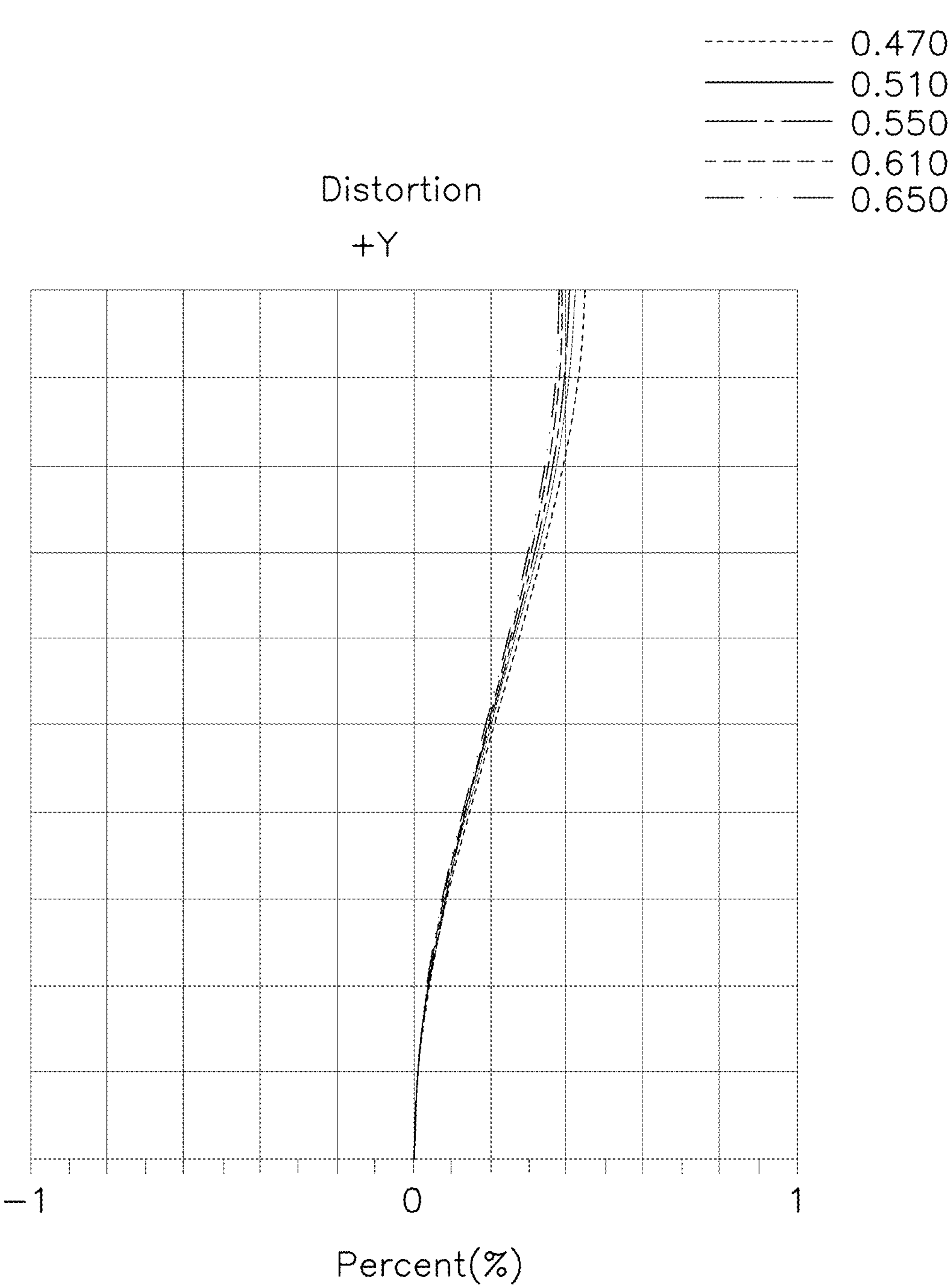
FIG. 5 is a distortion chart of the projection system of the first embodiment.

Referring to FIG. 5, a distortion chart for light with wavelengths of 470 nm, 510 nm, 555 nm, 610 nm, and 650 nm show that, at a maximum field of view of 5.006°, the distortion for these five wavelengths is less than 0.4%. Therefore, the projection system 100*a* provided in this first embodiment effectively corrects distortion, resulting in better image quality.

Figure 6:
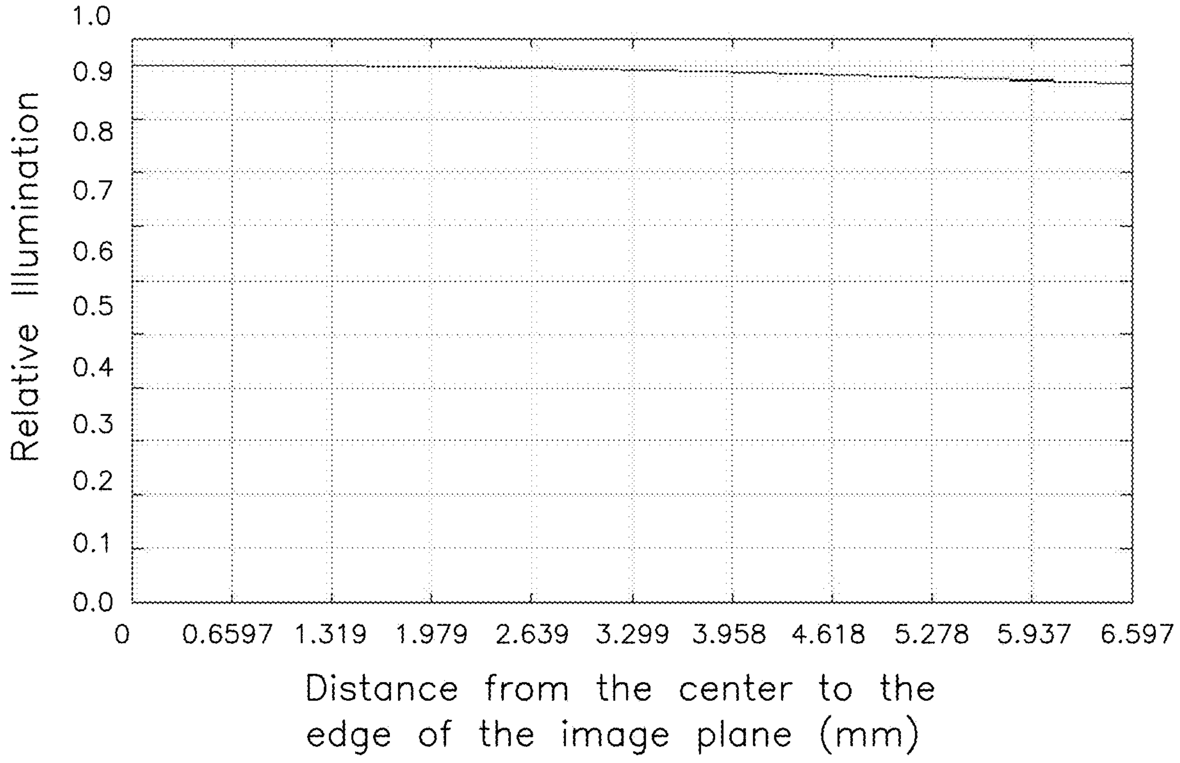
FIG. 6 is relative illumination chart of the projection system of the first embodiment.

Referring to FIG. 6, for light with a wavelength of 555 nm, a relative illumination of the projection system 100*a* is greater than 96%. Specifically, the horizontal axis represents the distance (mm) from the center to the edge of the image plane, and the vertical axis represents the relative illumination. The projection system 100*a* provided in this first embodiment has good relative illumination, thus preventing vignetting in the image.

Figure 7:
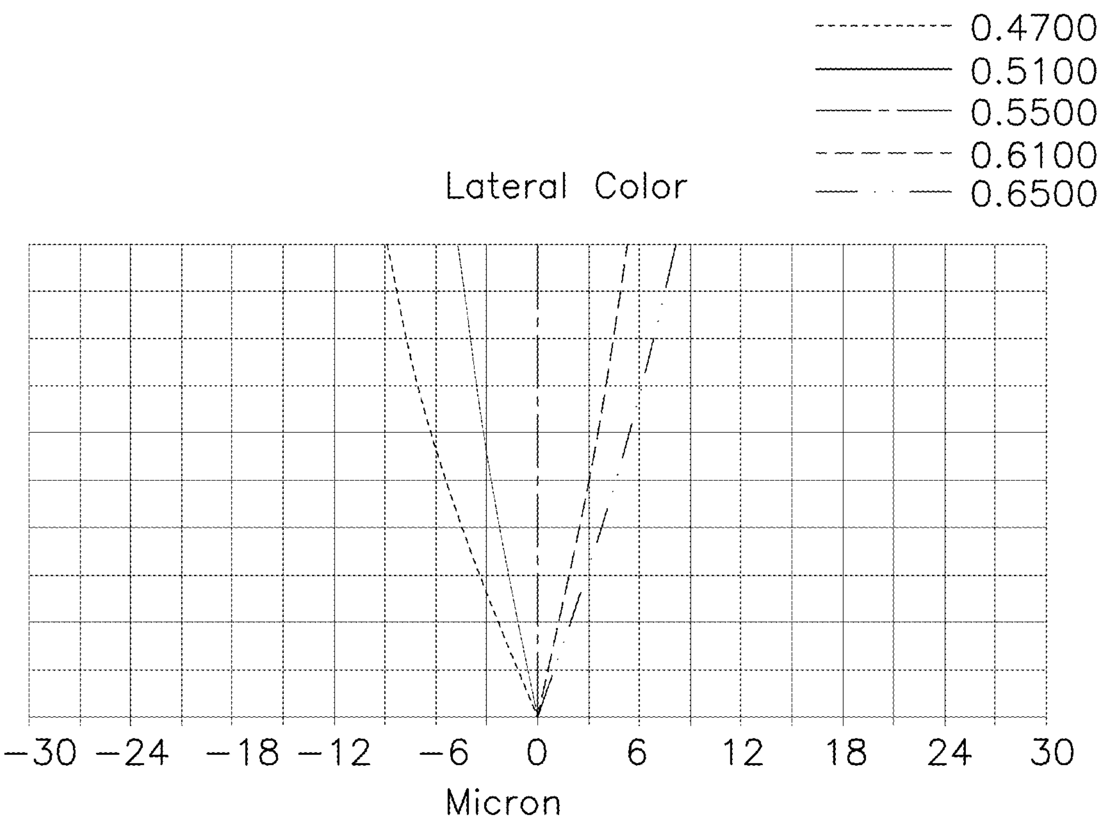
FIG. 7 is a lateral color chart of the projection system of the first embodiment.

Referring to FIG. 7, a lateral chromatic aberration chart for light with wavelengths of 470 nm, 510 nm, 555 nm, 610 nm, and 650 nm, using 555 nm as a reference, shows that at a maximum image height of 6.5970 mm, the maximum chromatic aberration between the five wavelengths is less than 16 μm. Specifically, chromatic aberration is a severe defect in lens systems where different wavelengths of light are refracted differently by the same material, causing light beams of multiple wavelengths to separate after passing through the lens, a phenomenon known as dispersion. Lateral chromatic aberration is due to the image magnification varying with wavelength, resulting in colored fringes, where different colors of light focus at different positions on the image plane. The projection system 100*a* provided in this first embodiment has low chromatic aberration, resulting in high-quality images.

Figure 8:
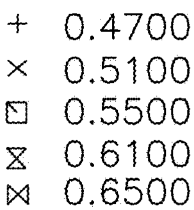
FIG. 8 is a spot diagram of the projection system of the first embodiment.
Figure 8:
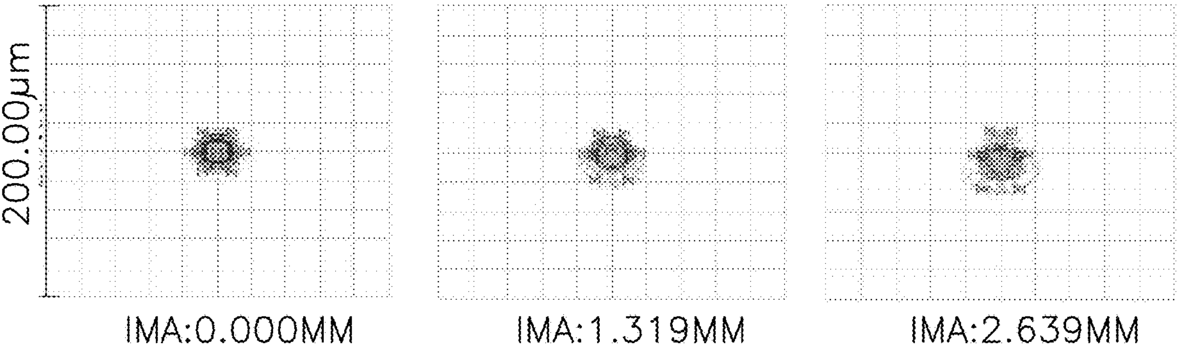
Figure 8:
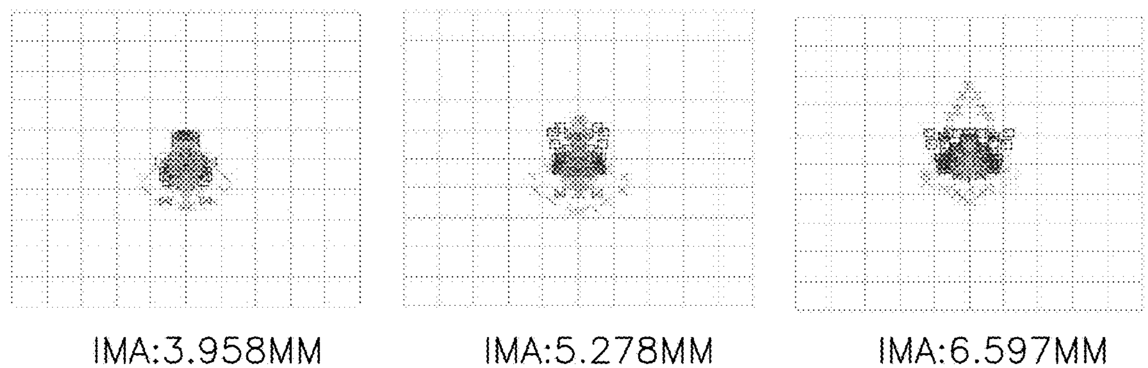

Referring to FIG. 8, a spot diagram for light with wavelengths of 470 nm, 510 nm, 555 nm, 610 nm, and 650 nm after passing through the projection system 100*a* show that, at different image heights, the root mean square (RMS) radius and the geometric maximum radius of the spot diagrams are relatively small. Specifically, a spot diagram represents the distribution of light rays from a point source after passing through the optical system, forming a blur circle rather than converging at a single point due to aberrations. In this embodiment, the spot diagrams of mixed light of five wavelengths at different image heights (IMA) are simulated after passing through the projection system 100*a*. The distribution of the blur spots can be approximated as the energy distribution of the image point, and the density of the spots measures the imaging quality, which can be quantified by calculating the RMS radius (m) and the geometric maximum radius (m) of each spot diagram.

FIG. 8 simulates the spot diagrams at image heights of 0.000 mm, 1.319 mm, 2.639 mm, 3.958 mm, 5.278 mm, and 6.597 mm. As the image height value of the chief ray increases, the spot distribution gradually disperses from the originally dense center image point at 0.000 mm. Calculations show that at 0.000 mm, the corresponding RMS radius is 7.772 μm, and the geometric maximum radius is 16.476 μm; at 1.319 mm, the corresponding RMS radius is 8.269 μm, and the geometric maximum radius is 21.605 μm; at 2.639 mm, the corresponding RMS radius is 10.064 μm, and the geometric maximum radius is 26.938 μm; at 3.958 mm, the corresponding RMS radius is 12.072 μm, and the geometric maximum radius is 32.101 μm; at 5.278 mm, the corresponding RMS radius is 12.751 μm, and the geometric maximum radius is 36.312 μm; at 6.597 mm, the corresponding RMS radius is 14.568 μm, and the geometric maximum radius is 53.725 μm. Thus, it can be seen that the projection system 100*a* provided in this first embodiment has low overall aberrations, resulting in high-quality projected images.

According to FIG. 3 to FIG. 8, the projection system 100*a* in the first embodiment has high resolution and relative illumination, and low aberrations.

Figure 9:
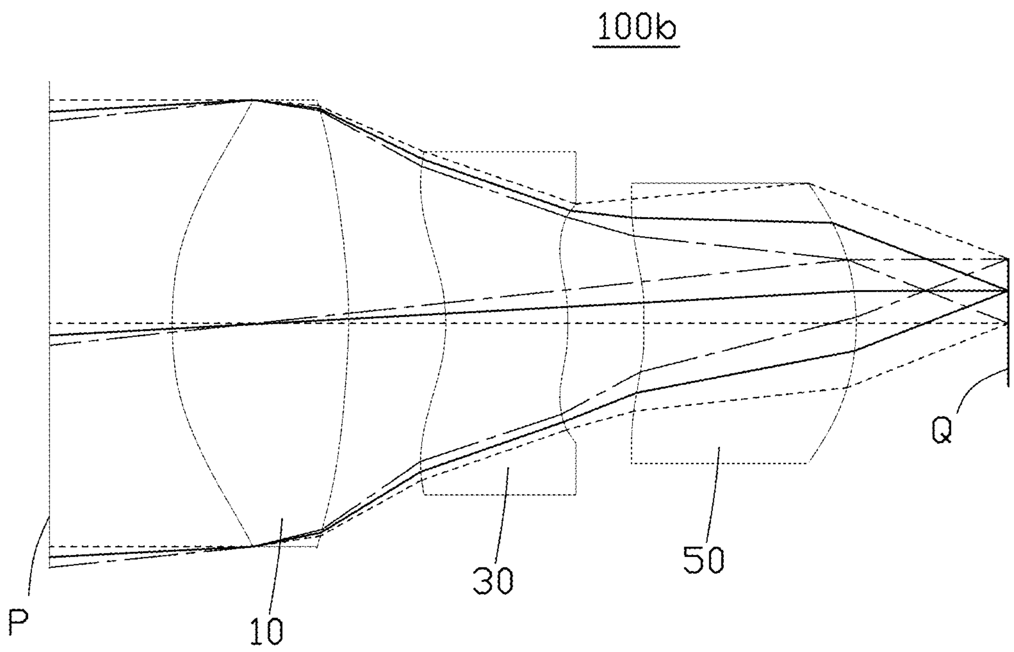
FIG. 9 illustrates a second embodiment of an optical path of a projection system according to the present disclosure.

FIG. 9 shows a projection system 100*b* according to a second embodiment of the present disclosure.

Table. 4 shows basic parameters of the projection system 100*b* of the second embodiment.

| | |
|---|---|
| IH | 6.597 mm |
| OTL | 85.628 mm |
| BFL | 15.491 mm |
| TL1 | 85.628 mm |
| TL2 | 57.624 mm |
| TL3 | 37.344 mm |
| T12 | 10.001 mm |
| T23 | 7.779 mm |
| NI | 1.54 |
| N2 | 1.66 |
| N3 | 1.54 |
| V1 | 56.1 |
| V2 | 20.4 |
| V3 | 56.1 |
| EPD | 45 mm |
| f | 62.582 mm |
| Fno | 1.39 |
| FOV | 12° |
| CRA | CRA < 0.516° |
| Distortion | 0.0% < Distortion < 0.4% |
| RIL | RIL > 96% |
| f1 | 39.269 mm |
| f2 | −144.778 mm |
| f3 | 67.299 mm |
| 1/f1 | 0.025 |
| f12 | 60.151 mm |
| f23 | 62.028 mm |
| f3/f12 | 1.119 |
| f1/f23 | 0.633 |
| OTL/IH | 12.980 |
| CT1 | 18.003 mm |
| ET1 | 7.485 mm |
| CT1/ET1 | 2.405 |
| CT2 | 12.501 mm |
| ET2 | 15.533 mm |
| CT2/ET2 | 0.805 |
| CT3 | 21.853 mm |
| ET3 | 18.214 mm |
| CT3/ET3 | 1.200 |
| TR | 4.90 |

Table. 5 shows parameters of surfaces of different elements of the projection system 100*b* of the second embodiment.

| Surface number | Elements | Surface Type | Radius of curvature | Thickness | Refractive index | Abbe number | Semidiameter |
|---|---|---|---|---|---|---|---|
| Projection surface | | standard surface | infinite | infinite | | | infinite |
| | | standard surface | infinite | 20.000 | | | 24.600 |
| STO | aperture | standard surface | infinite | −7.336 | | | 22.500 |
| F1 | First | aspheric | 29.606 | 18.003 | 1.54 | 56.1 | 22.606 |
| F2 | lens 10 | aspheric | −61.026 | 10.001 | | | 22.028 |
| F3 | Second | aspheric | −15.627 | 12.501 | 1.66 | 20.4 | 17.396 |
| F4 | lens 30 | aspheric | −24.612 | 7.779 | | | 12.054 |
| F5 | Third | aspheric | −28.452 | 21.853 | 1.54 | 56.1 | 12.852 |
| F6 | lens 50 | aspheric | −20.384 | 15.491 | | | 14.080 |
| Image source surface | | standard surface | infinite | 0 | | | 6.597 |

Table. 6 is coefficient of the aspheric surfaces of the first lens 10, the second lens 30 and the third lens 50 of the projection system 100*b* of the second embodiment.

| Surface | K | $A_4$ | $A_6$ | $A_8$ |
|---|---|---|---|---|
| F1 | −0.508 | 1.0469E−06 | −4.8669E−09 | 7.7230E−13 |
| F2 | −39.441 | −2.7458E−06 | −9.7479E−10 | 6.2416E−12 |
| F3 | −6.153 | 3.4315E−05 | 1.9562E−08 | −1.3132E−10 |
| F4 | −12.243 | 8.8651E−05 | 3.3266E−08 | 6.3413E−10 |
| F5 | −25.456 | −5.8236E−06 | 6.1229E−08 | −1.9292E−10 |
| F6 | −0.342 | 1.8667E−05 | −1.3620E−07 | 4.7267E−10 |

| Surface | $A_{10}$ | $A_{12}$ | $A_{14}$ | $A_{16}$ |
|---|---|---|---|---|
| F1 | −3.5280E−14 | 4.7682E−17 | 5.0026E−20 | −1.6471E−22 |
| F2 | 5.9951E−15 | −2.9846E−17 | −9.3019E−20 | 1.2094E−22 |
| F3 | 2.5086E−14 | 6.6714E−16 | −5.2973E−19 | −8.4947E−22 |
| F4 | 1.1660E−11 | −1.4763E−14 | −7.1508E−16 | 4.6526E−18 |
| F5 | 5.7551E−12 | −6.8176E−15 | −2.4242E−16 | 1.0539E−18 |
| F6 | 2.0325E−12 | −1.7791E−14 | 6.5892E−18 | 1.2016E−19 |

Figure 10:
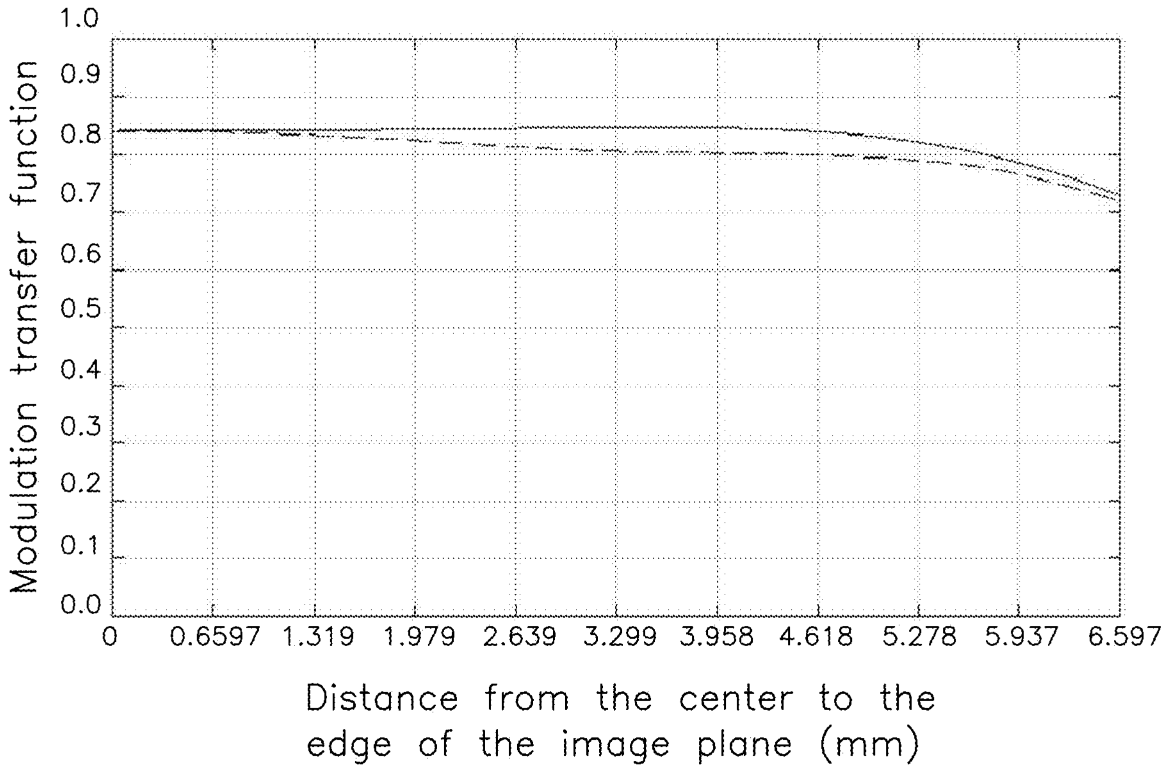
FIG. 10 is a MTF chart of the projection system of the second embodiment.

As FIG. 10 shows, the MTF test chart for light with wavelengths from 470 nm to 650 nm after passing through the projection system 100*b* in the second embodiment shows that the MTF values of the projection system 100*a* are generally greater than 0.7, indicating high resolution. Wherein, the spatial frequency used is 12.5 cyc/mm in the MTF tests of the second embodiment.

Figure 11:
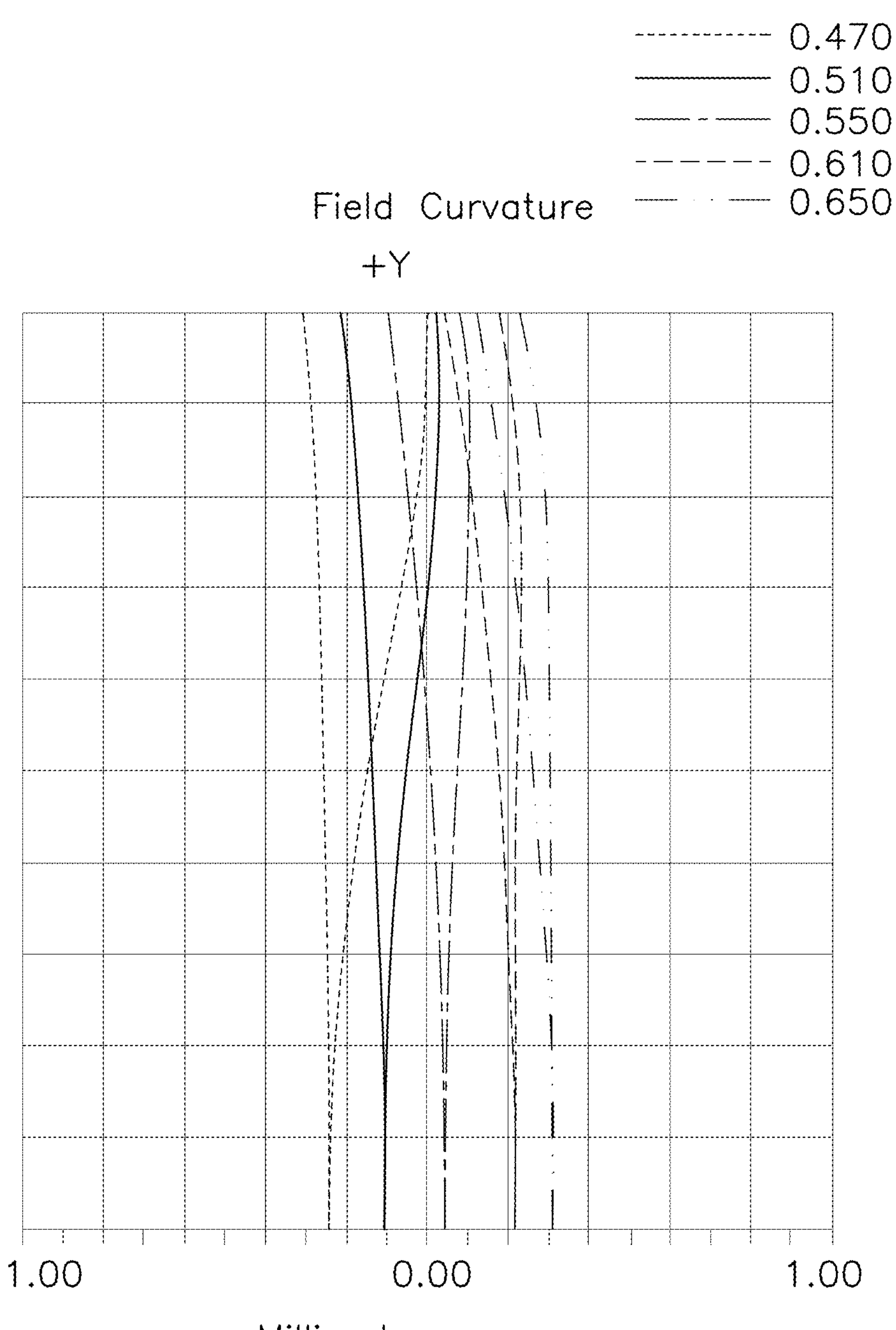
FIG. 11 is a field curvature chart of the projection system of the second embodiment.

Referring to FIG. 11, a field curvature chart for light with wavelengths of 470 nm, 510 nm, 555 nm, 610 nm, and 650 nm show that, at a maximum field of view of 5.006°, the field curvature for these five wavelengths is less than 0.3 mm. The projection system 100*b* provided in this second embodiment has low field curvature, resulting in better image quality.

Figure 12:
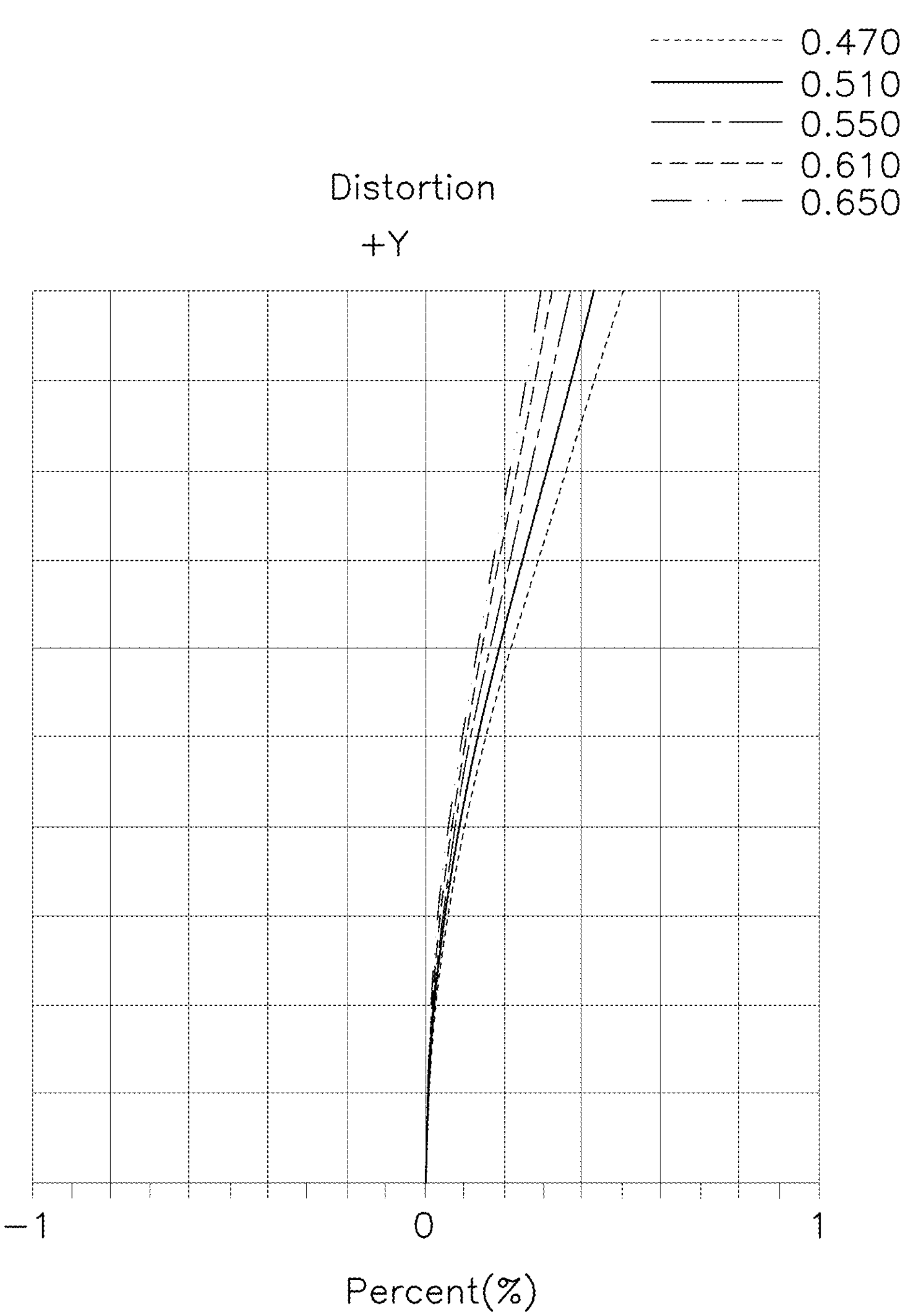
FIG. 12 is a distortion chart of the projection system of the second embodiment.

Referring to FIG. 12, a distortion chart for light with wavelengths of 470 nm, 510 nm, 555 nm, 610 nm, and 650 nm show that, at a maximum field of view of 5.006°, expect the light with wavelength of 470 nm, the distortion for these wavelengths is less than 0.4%. Therefore, the projection system 100*b* provided in this second embodiment effectively corrects distortion, resulting in better image quality.

Figure 13:
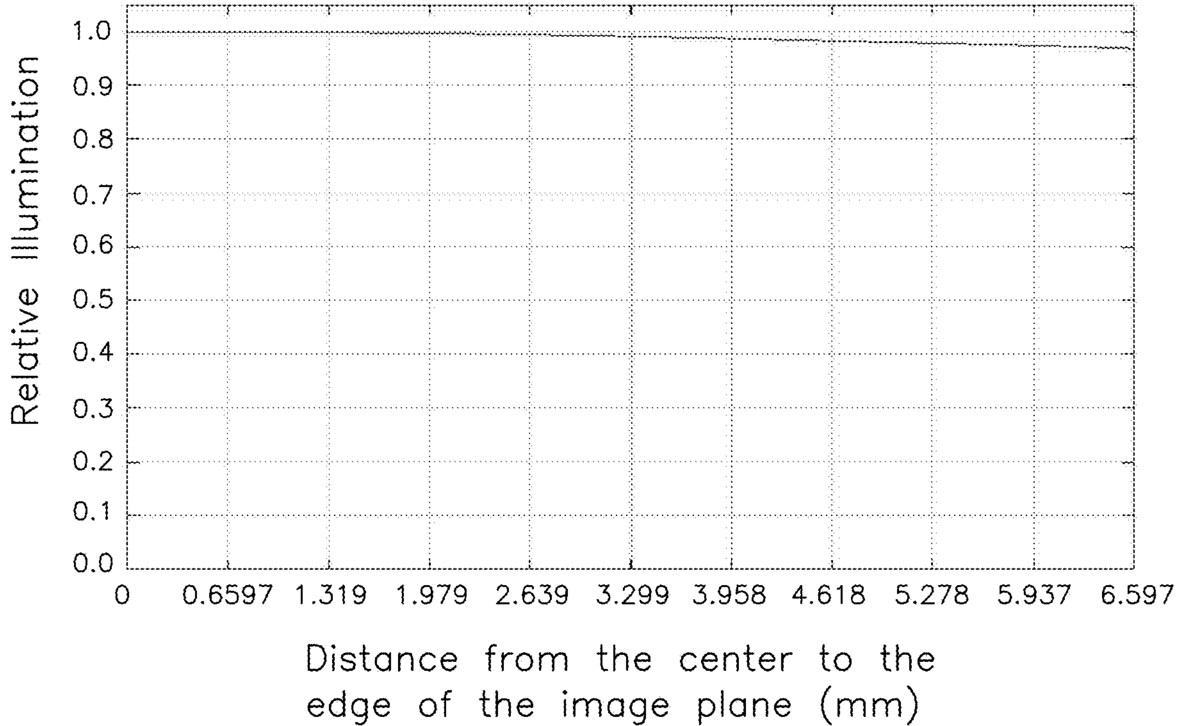
FIG. 13 is relative illumination chart of the projection system of the second embodiment.

Referring to FIG. 13, for light with a wavelength of 555 nm, a relative illumination of the projection system 100*b* is greater than 96%. Specifically, the horizontal axis represents the distance (mm) from the center to the edge of the image plane, and the vertical axis represents the relative illumination. The projection system 100*b* provided in this second embodiment has good relative illumination, thus preventing vignetting in the image.

Figure 14:
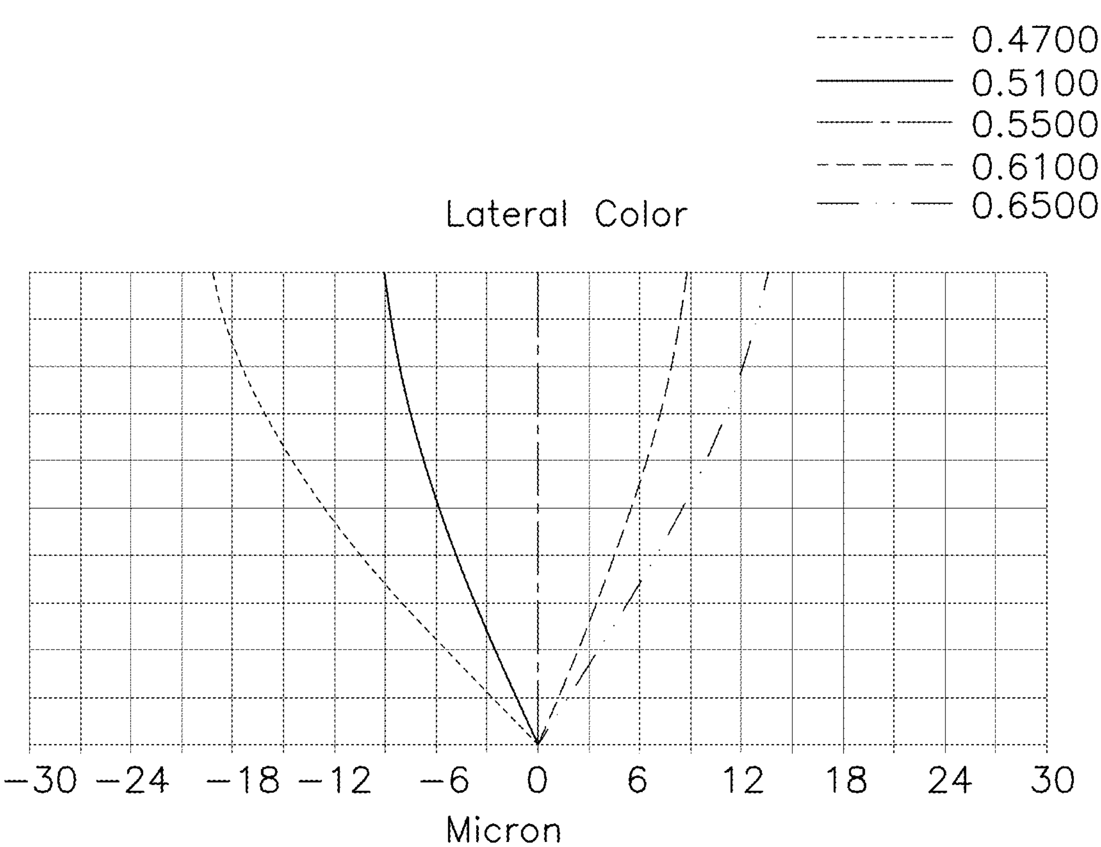
FIG. 14 is a lateral color chart of the projection system of the second embodiment.

Referring to FIG. 14, a lateral chromatic aberration chart for light with wavelengths of 470 nm, 510 nm, 555 nm, 610 nm, and 650 nm, using 555 nm as a reference, shows that at a maximum image height of 6.5970 mm, the maximum chromatic aberration between the five wavelengths is less than 33 μm. The projection system 100*b* provided in this second embodiment has low chromatic aberration, resulting in high-quality images.

Figure 15:
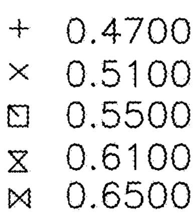
FIG. 15 is a spot diagram of the projection system of the second embodiment.
Figure 15:
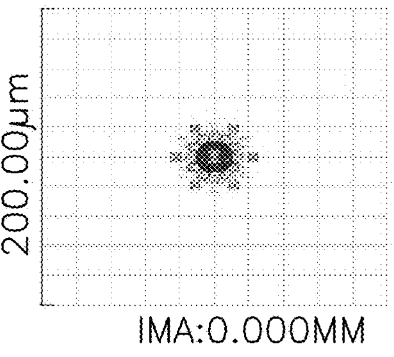
Figure 15:
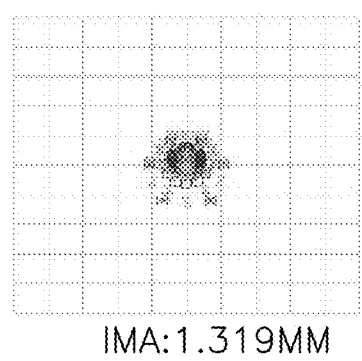
Figure 15:
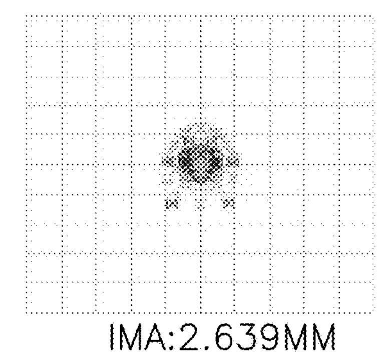
Figure 15:
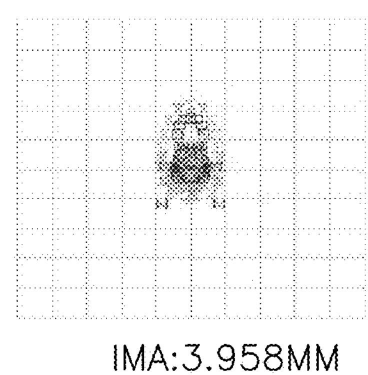
Figure 15:
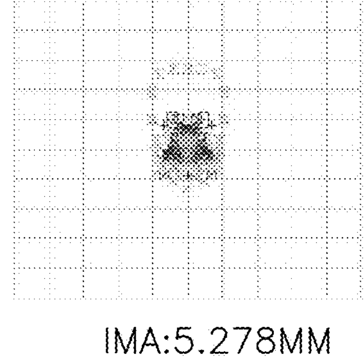
Figure 15:
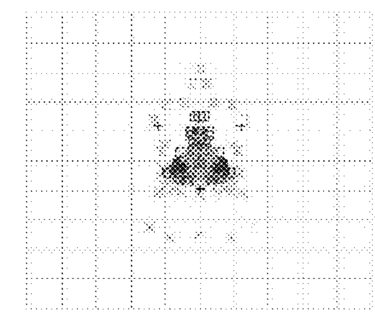

Referring to FIG. 15, a spot diagram for light with wavelengths of 470 nm, 510 nm, 555 nm, 610 nm, and 650 nm after passing through the projection system 100*b* show that, at different image heights, the RMS radius and the geometric maximum radius of the spot diagrams are relatively small.

Specifically, FIG. 15 simulates the spot diagrams at image heights of 0.000 mm, 1.319 mm, 2.639 mm, 3.958 mm, 5.278 mm, and 6.597 mm. As the image height value of the chief ray increases, the spot distribution gradually disperses from the originally dense center image point at 0.000 mm. Calculations show that at 0.000 mm, the corresponding RMS radius is 9.155 μm, and the geometric maximum radius is 22.432 μm; at 1.319 mm, the corresponding RMS radius is 9.275 μm, and the geometric maximum radius is 27.610 μm; at 2.639 mm, the corresponding RMS radius is 10.035 μm, and the geometric maximum radius is 30.695 μm; at 3.958 mm, the corresponding RMS radius is 12.470 μm, and the geometric maximum radius is 43.748 μm; at 5.278 mm, the corresponding RMS radius is 13.976 μm, and the geometric maximum radius is 54.916 μm; at 6.597 mm, the corresponding RMS radius is 17.985 μm, and the geometric maximum radius is 62.804 μm. Thus, it can be seen that the projection system 100*b* provided in this second embodiment has low overall aberrations, resulting in high-quality projected images.

According to FIG. 10 to FIG. 15, the projection system 100*b* in the second embodiment has high resolution and relative illumination, and low aberrations.

Figure 16:
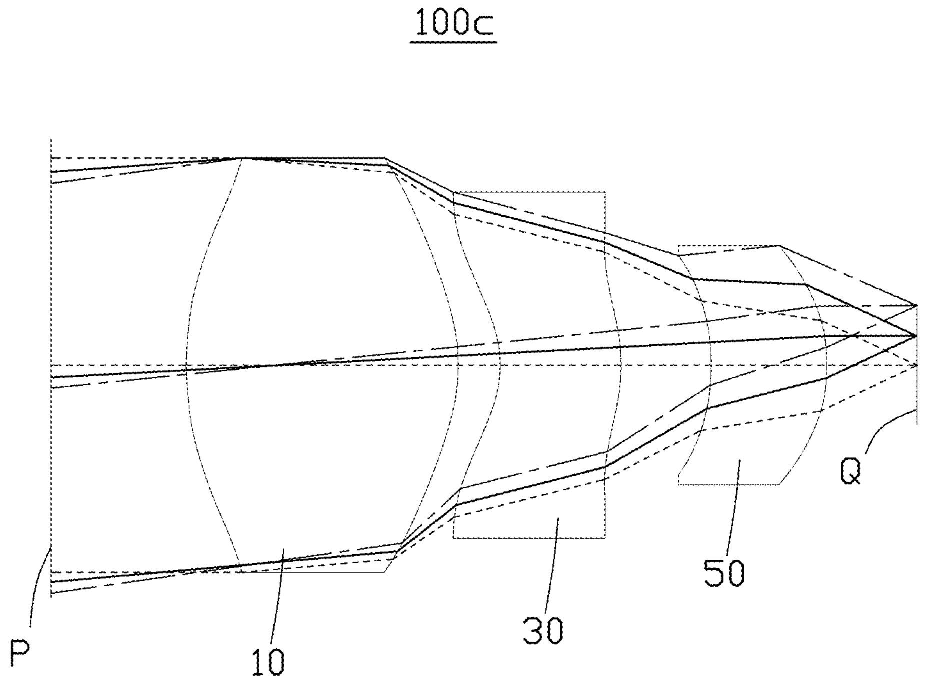
FIG. 16 illustrates a third embodiment of an optical path of a projection system according to the present disclosure.

FIG. 16 shows a projection system 100*c* according to a third embodiment of the present disclosure.

Table. 7 shows basic parameters of the projection system 100*c* of the third embodiment.

| | |
|---|---|
| IH | 6.597 mm |
| OTL | 81.024 mm |
| BFL | 10.035 mm |
| TL1 | 81.024 mm |
| TL2 | 46.175 mm |
| TL3 | 22.793 mm |
| T12 | 4.666 mm |
| T23 | 10.002 mm |
| N1 | 1.54 |
| N2 | 1.66 |
| N3 | 1.54 |
| V1 | 56.1 |
| V2 | 20.4 |
| V3 | 56.1 |
| EPD | 45 mm |
| f | 53.577 mm |

-continued

| | |
|---|---|
| Fno | 1.19 |
| FOV | 14° |
| CRA | <0.506° |
| Distortion | 0.0% < Distortion < 0.4% |
| RIL | >96% |
| f1 | 27.977 mm |
| f2 | −89.609 mm |
| f3 | 85.299 mm |
| 1/f1 | 0.036 |
| f12 | 49.324 mm |
| f23 | 96.200 mm |
| f3/f12 | 1.729 |
| f1/f23 | 0.291 |
| OTL/IH | 12.282 |
| CT1 | 30.182 mm |
| ET1 | 15.887 mm |
| CT1/ET1 | 1.900 |
| CT2 | 13.380 mm |
| ET2 | 16.885 mm |
| CT2/ET2 | 0.792 |
| CT3 | 12.758 mm |
| ET3 | 11.177 mm |
| CT3/ET3 | 1.141 |
| TR | 4.20 |

Table. 8 shows parameters of surfaces of different elements of the projection system 100*c* of the third embodiment.

| Surface number | Elements | Surface Type | Radius of curvature | Thickness | Refractive index | Abbe number | Semidiameter |
|---|---|---|---|---|---|---|---|
| Projection surface | | standard surface | infinite | infinite | | | infinite |
| | | standard surface | infinite | 20.000 | | | 24.953 |
| STO | aperture | standard surface | infinite | −5.069 | | | 22.500 |
| F1 | First lens | aspheric | 34.787 | 30.182 | 1.54 | 56.1 | 22.635 |
| F2 | 10 | aspheric | −18.886 | 4.666 | | | 22.701 |
| F3 | Second | aspheric | −10.947 | 13.380 | 1.66 | 20.4 | 19.072 |
| F4 | lens 30 | aspheric | −19.955 | 10.002 | | | 14.574 |
| F5 | Third | aspheric | −22.073 | 12.758 | 1.54 | 56.1 | 12.141 |
| F6 | lens 50 | aspheric | −18.032 | 10.035 | | | 13.186 |
| Image source surface | | standard surface | infinite | 0.000 | | | 6.597 |

Table. 9 is coefficient of the aspheric surfaces of the first lens 10, the second lens 30 and the third lens 50 of the projection system 100*c* of the third embodiment.

| Surface | K | $A_4$ | $A_6$ | $A_8$ |
|---|---|---|---|---|
| F1 | −0.476 | −8.2379E−07 | −8.8892E−09 | 1.1303E−11 |
| F2 | −5.974 | −4.2819E−07 | −4.0413E−09 | −1.2412E−11 |
| F3 | −3.895 | 3.0577E−05 | −3.3545E−08 | −3.7578E−11 |
| F4 | −10.853 | −1.6807E−05 | 5.8480E−07 | −2.7863E−09 |
| F5 | −13.731 | −6.7443E−05 | −5.9370E−08 | 2.1512E−10 |
| F6 | −0.575 | 1.4566E−05 | −2.5992E−07 | 1.1352E−09 |

| Surface | $A_{10}$ | $A_{12}$ | $A_{14}$ | $A_{16}$ |
|---|---|---|---|---|
| F1 | −3.2414E−14 | 5.9786E−18 | 1.0637E−20 | −1.7991E−23 |
| F2 | 7.3712E−15 | 1.9578E−17 | −2.2194E−21 | −2.6293E−23 |
| F3 | 1.6298E−13 | 1.9776E−16 | −6.9634E−19 | 3.0110E−22 |
| F4 | −4.6378E−12 | 1.1675E−13 | −4.9921E−16 | 7.5261E−19 |
| F5 | 5.0186E−13 | 4.7689E−14 | −1.0169E−15 | 4.3324E−18 |
| F6 | 1.3922E−12 | −2.3498E−14 | −3.8612E−17 | 4.3812E−19 |

Figure 17:
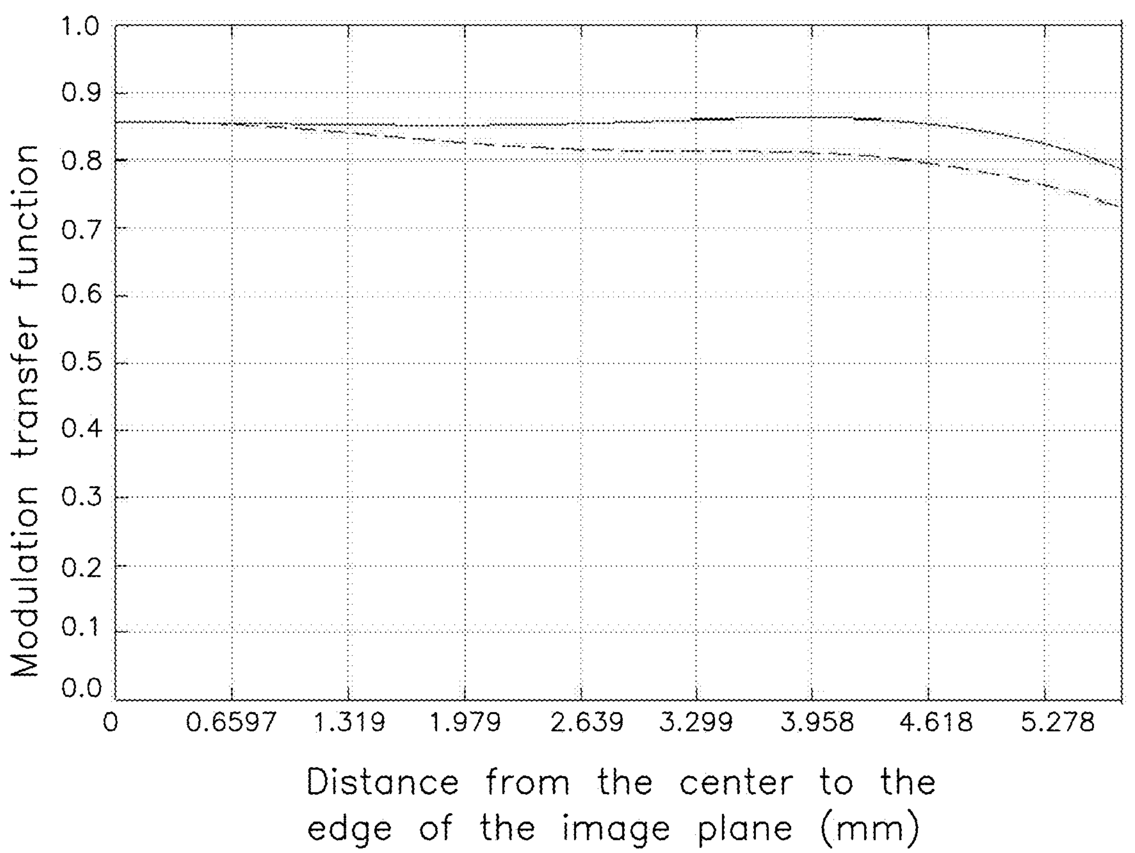
FIG. 17 is a MTF chart of the projection system of the third embodiment.

As FIG. 17 shows, the MTF test chart for light with wavelengths from 470 nm to 650 nm after passing through the projection system 100*c* in the third embodiment shows that the MTF values of the projection system 100*a* are generally greater than 0.7, indicating high resolution. Wherein, the spatial frequency used is 12.5 cyc/mm in the MTF tests of the third embodiment.

Figure 18:
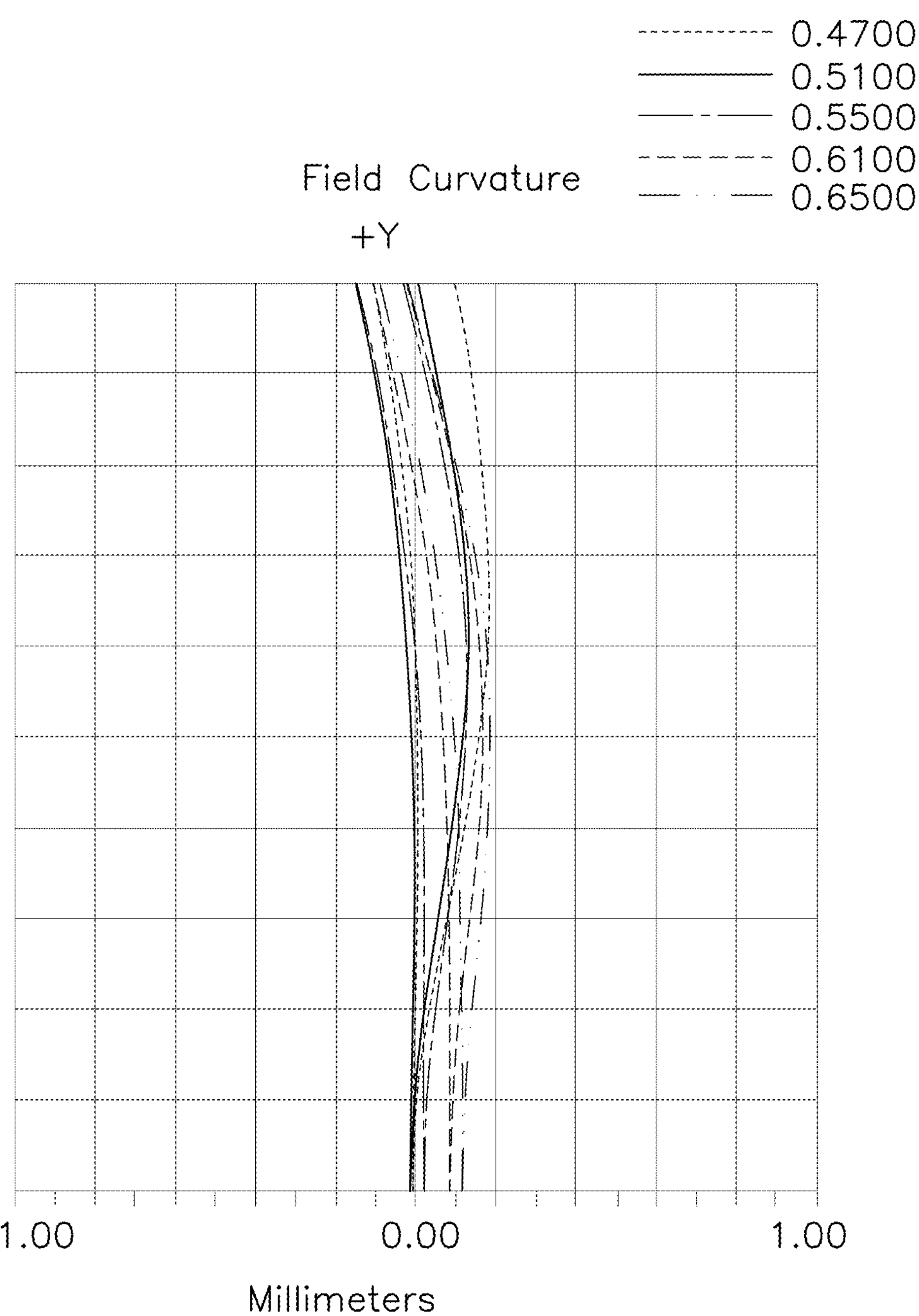
FIG. 18 is a field curvature chart of the projection system of the third embodiment.

Referring to FIG. 18, a field curvature chart for light with wavelengths of 470 nm, 510 nm, 555 nm, 610 nm, and 650 nm show that, at a maximum field of view of 6.993°, the field curvature for these five wavelengths is less than 0.2 mm. The projection system 100*c* provided in this third embodiment has low field curvature, resulting in better image quality.

Figure 19:
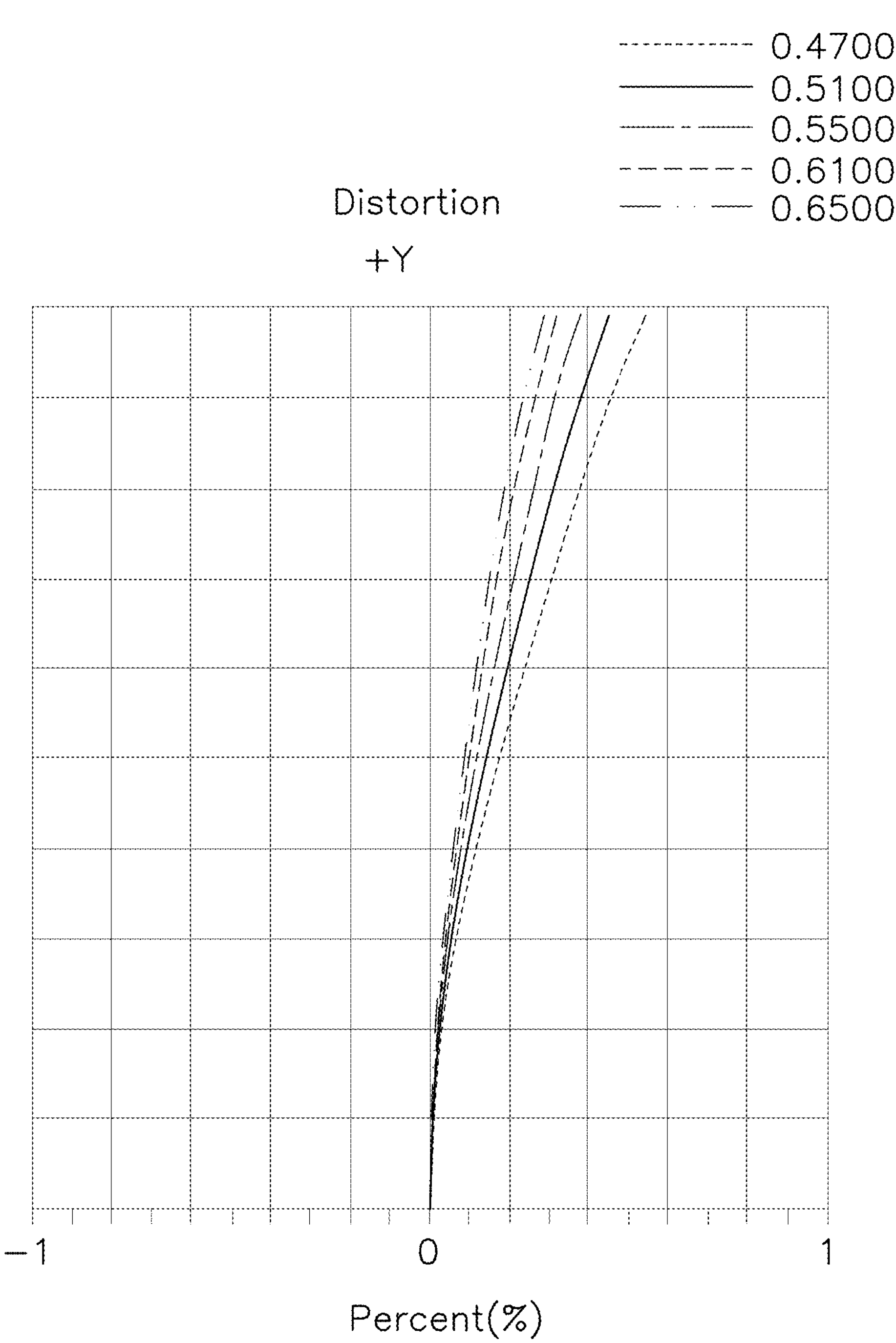
FIG. 19 is a distortion chart of the projection system of the third embodiment.

Referring to FIG. 19, a distortion chart for light with wavelengths of 470 nm, 510 nm, 555 nm, 610 nm, and 650 nm show that, at a maximum field of view of 5.995°, expect the light with wavelength of 470 nm, the distortion for these wavelengths is less than 0.4%. Therefore, the projection system 100*c* provided in this third embodiment effectively corrects distortion, resulting in better image quality.

Figure 20:
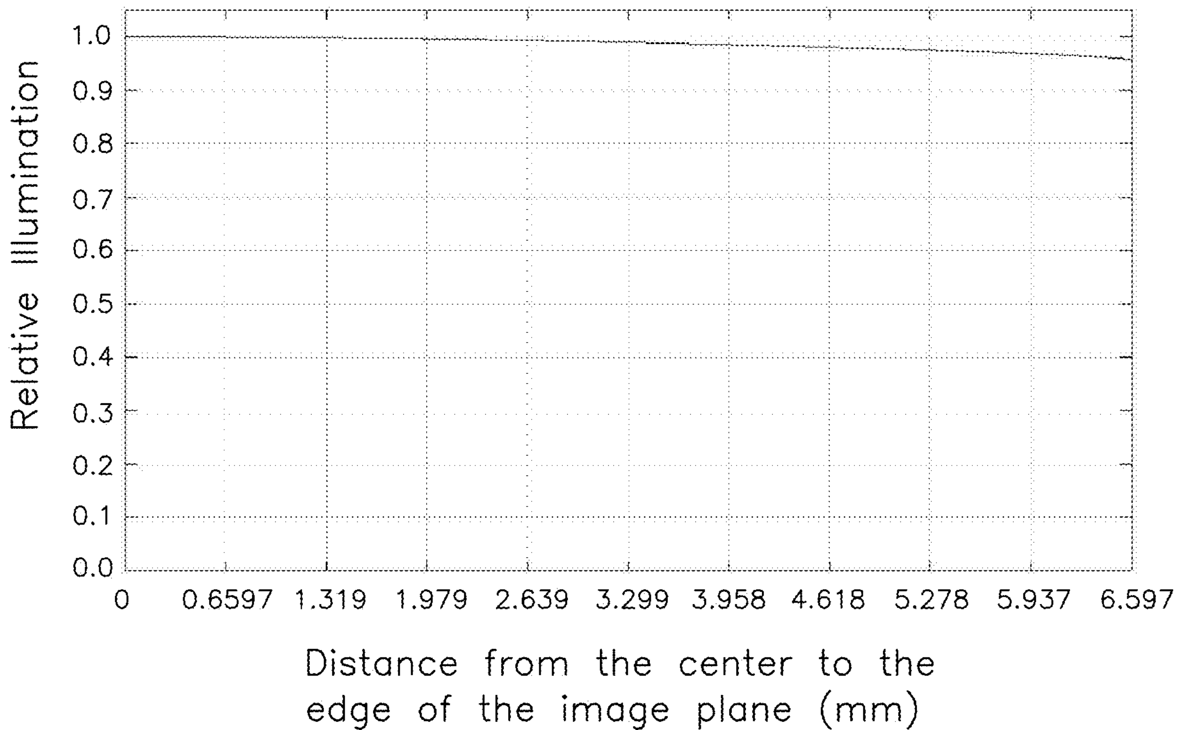
FIG. 20 is relative illumination chart of the projection system of the third embodiment.

Referring to FIG. 20, for light with a wavelength of 555 nm, a relative illumination of the projection system 100*c* is greater than 96%. Specifically, the horizontal axis represents the distance (mm) from the center to the edge of the image plane, and the vertical axis represents the relative illumination. The projection system 100*c* provided in this third embodiment has good relative illumination, thus preventing vignetting in the image.

Figure 21:
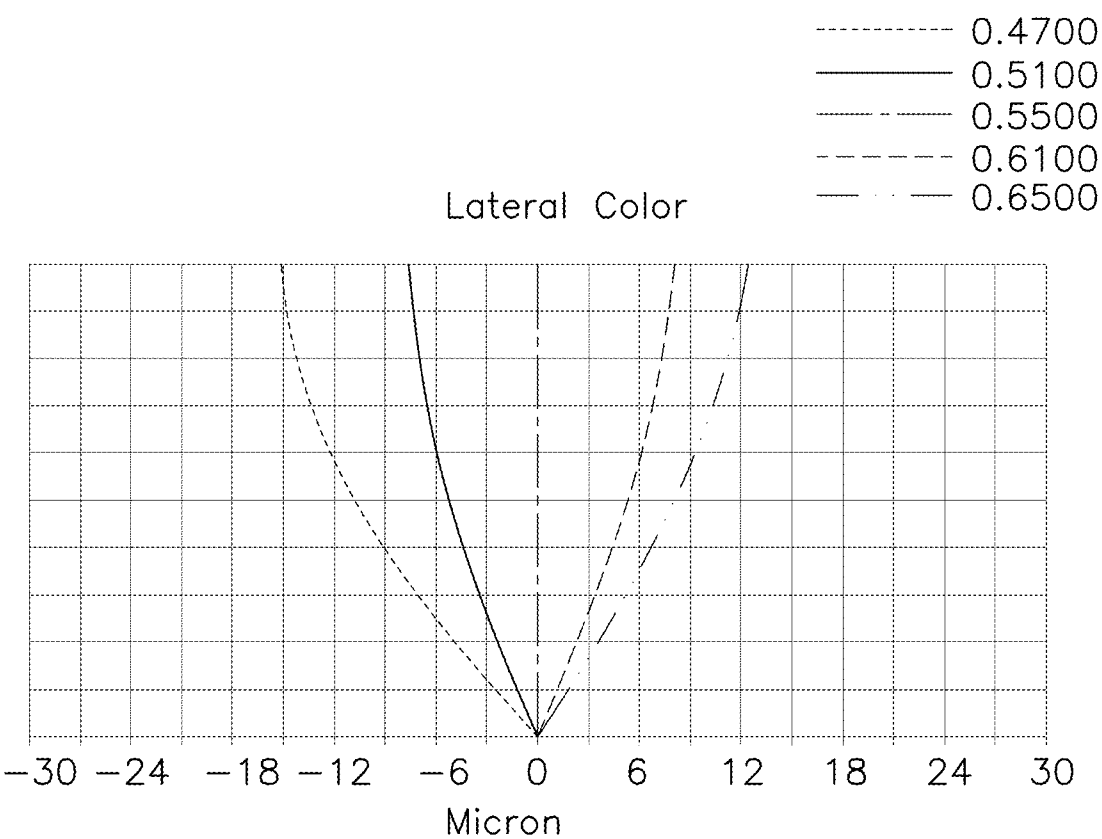
FIG. 21 is a lateral color chart of the projection system of the third embodiment.

Referring to FIG. 21, a lateral chromatic aberration chart for light with wavelengths of 470 nm, 510 nm, 555 nm, 610 nm, and 650 nm, using 555 nm as a reference, shows that at a maximum image height of 6.5970 mm, the maximum chromatic aberration between the five wavelengths is less than 28 μm. The projection system 100*c* provided in this third embodiment has low chromatic aberration, resulting in high-quality images.

Figure 22:
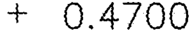
FIG. 22 is a spot diagram of the projection system of the third embodiment.
Figure 22:
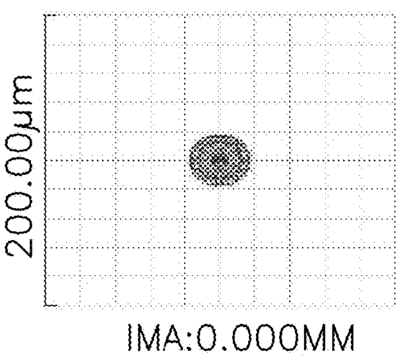
Figure 22:
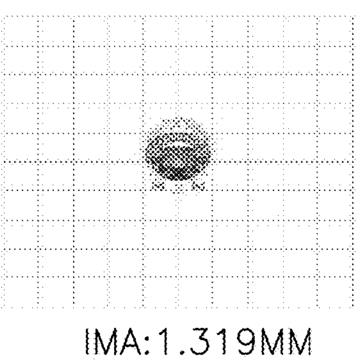
Figure 22:
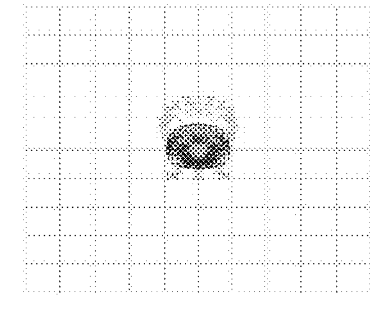
Figure 22:
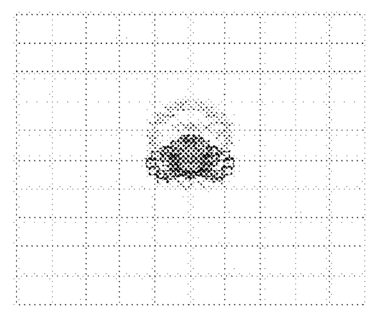
Figure 22:
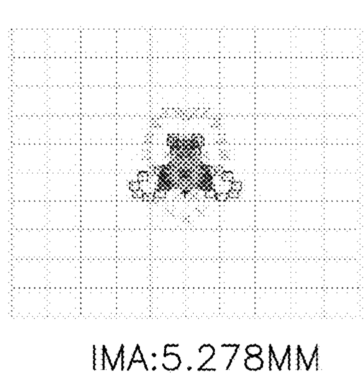
Figure 22:
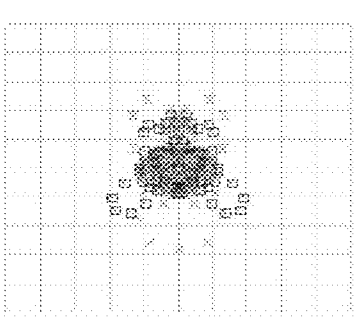

Referring to FIG. 22, a spot diagram for light with wavelengths of 470 nm, 510 nm, 555 nm, 610 nm, and 650 nm after passing through the projection system 100*c* show that, at different image heights, the RMS radius and the geometric maximum radius of the spot diagrams are relatively small.

Specifically, FIG. 22 simulates the spot diagrams at image heights of 0.000 mm, 1.319 mm, 2.639 mm, 3.958 mm, 5.278 mm, and 6.597 mm. As the image height value of the chief ray increases, the spot distribution gradually disperses from the originally dense center image point at 0.000 mm. Calculations show that at 0.000 mm, the corresponding RMS radius is 9.616 μm, and the geometric maximum radius is 15.890 μm; at 1.319 mm, the corresponding RMS radius is 10.525 μm, and the geometric maximum radius is 27.440 μm; at 2.639 mm, the corresponding RMS radius is 11.538 μm, and the geometric maximum radius is 35.053 μm; at 3.958 mm, the corresponding RMS radius is 11.978 μm, and the geometric maximum radius is 36.864 μm; at 5.278 mm, the corresponding RMS radius is 14.632 μm, and the geometric maximum radius is 43.249 μm; at 6.597 mm, the corresponding RMS radius is 20.927 μm, and the geometric maximum radius is 56.832 μm. Thus, it can be seen that the projection system 100*c* provided in this third embodiment has low overall aberrations, resulting in high-quality projected images.

According to FIG. 16 to FIG. 22, the projection system 100*c* in the third embodiment has high resolution and relative illumination, and low aberrations.

By setting the parameters of the first lens 10, the second lens 30, and the third lens 50, and other optical parameters, the projection system 100 can project images with a small field of view, small CRA, low distortion, high relative illumination, and high resolution.

Figure 23:
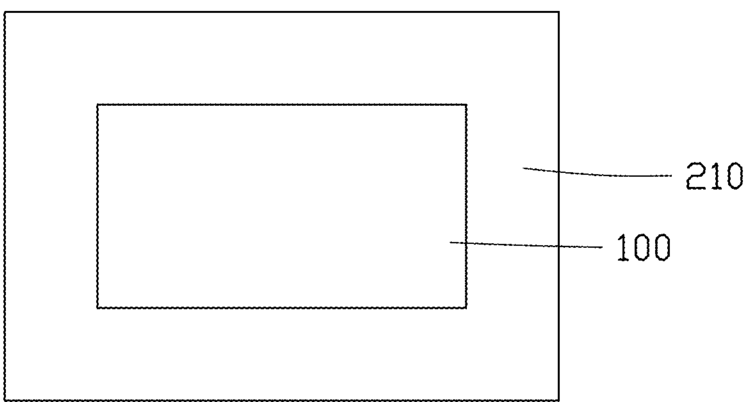
FIG. 23 illustrates an embodiment of an illumination device according to the present disclosure.

FIG. 23 illustrates an illumination device 200 according to an embodiment of the present disclosure. The illumination device 200 includes the projection system 100 mentioned above and a cover 210 for accommodating the projection system 100. Specifically, the illumination device 200 can be a headlamp on a vehicle, a door projection lamp on a vehicle, or other projection lamps. The cover 210 can be designed in a corresponding shape according to the actual application scenario of the illumination device 200, such as an outer shell of a headlamp or an outer shell of a projection lamp. Taking the application of the illumination device 200 as a vehicle headlamp as an example, the illumination device 200 provided in this embodiment designs the optical parameters of the projection system 100 so that the illumination device 200 can project clear images on a road surface. These images can be used to display various information, such as the vehicle's driving status, road conditions, navigation information, warning information, or other information, which helps improve the user experience.

It is to be understood, even though information and advantages of the present exemplary embodiments have been set fourth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A projection system comprising: a first lens, a second lens, and a third lens arranged in sequence from a projection surface to an image source surface;

wherein:

a maximal field-of-view angle DFOV of the projection system satisfies: 10°<DFOV<14°;

a chief ray angle CRA of the projection system satisfies: CRA<0.52°;

a throw ratio TR of the projection system satisfies: 4.2<TR<5.9;

a focal length of the first lens f1 of the projection system and a combined focal length of the second lens and the third lens f23 of the projection system satisfy: 0.29<f1/f23<0.75;

a focal length of the third lens f3 of the projection system and a combined focal length of the second lens and the first lens f12 of the projection system satisfy: 0.67<f3/f12<1.73;

an optical total length OTL of the projection system and a maximum image height IH on the image source surface of the projection system satisfy: 12<OTL/IH<15;

a center thickness CT3 of the third lens and an edge thickness ET3 of the third lens of the projection system satisfy: 1.1<CT3/ET3<1.3.

2. The projection system of claim 1, wherein the first lens has a positive refractive power, the second lens has a negative refractive power, and the third lens has a positive refractive power.

3. The projection system of claim 1, wherein the first lens, the second lens, and the third lens are aspherical lens.

4. The projection system of claim 1, further satisfying expressions below:

$$0.66 < f/OTL < 0.76; 1.46 < f/f1 < 1.92; 0.63 < f/f3 < 1.27;$$

wherein, f is a combined focal length of the first lens, the second lens, and the third lens.

5. The projection system of claim 1, further comprising an aperture, the aperture is on a side of the first lens away from the second lens.

6. The projection system of claim 1, wherein an aperture value FNO of the projection system satisfies: 1.1<FNO<1.7.

7. The projection system of claim 1, wherein a distortion of the projection system satisfies: 0.0%<Distortion<0.4%.

8. The projection system of claim 1, wherein a relative illumination RIL of the projection system satisfies: RIL>96%.

9. The projection system of claim 1, further comprising a display module, the display module is arranged on the image source surface; a distance from a central position of the display module to an edge position of the display module is the maximum image height of the projection system.

10. An illumination device comprising:

a projection system comprising a first lens, a second lens, and a third lens arranged in sequence from a projection surface to an image source surface; and a cover accommodating the projection system;

wherein:

a maximal field-of-view angle DFOV of the projection system satisfies: 10°<DFOV<14°;

a chief ray angle CRA of the projection system satisfies: CRA<0.52°;

a throw ratio TR of the projection system satisfies: 4.2<TR<5.9;

a focal length of the first lens f1 of the projection system and a combined focal length of the second lens and the third lens f23 of the projection system satisfy: 0.29<f1/f23<0.75;

a focal length of the third lens f3 of the projection system and a combined focal length of the second lens and the first lens f12 of the projection system satisfy: 0.67<f3/f12<1.73;

an optical total length OTL of the projection system and a maximum image height UH on the image source surface of the projection system satisfy: 12<OTL/IH<15;

a center thickness CT3 of the third lens and an edge thickness ET3 of the third lens of the projection system satisfy: 1.1<CT3/ET3<1.3.

11. The illumination device of claim 10, wherein the cover is a headlamp cover or a projector lamp cover.

12. The illumination device of claim 10, wherein the first lens has a positive refractive power, the second lens has a negative refractive power, and the third lens has a positive refractive power.

13. The illumination device of claim 10, wherein the first lens, the second lens, and the third lens are aspherical lens.

14. The illumination device of claim 10, wherein the projection system further satisfies expressions below:

$$0.66 < f/OTL < 0.76; 1.46 < f/f1 < 1.92; 0.63 < f/f3 < 1.27;$$

wherein, f is a combined focal length of the first lens, the second lens, and the third lens.

15. The illumination device of claim 10, wherein the projection system further comprises an aperture, the aperture is on a side of the first lens away from the second lens.

16. The illumination device of claim 10, wherein an aperture value FNO of the projection system satisfies: 1.1<FNO<1.7.

17. The illumination device of claim 10, wherein a distortion of the projection system satisfies: 0.0%<Distortion<0.4%.

18. The illumination device of claim 10, wherein a relative illumination RIL of the projection system satisfies: RIL>96%.

19. The illumination device of claim 10, wherein the projection system further comprises a display module, the display module is arranged on the image source surface; a distance from a central position of the display module to an edge position of the display module is the maximum image height of the projection system.

20. The illumination device of claim 19, wherein the illumination device is a headlamp on vehicles and is configured for projecting images on a road surface.

* * * * *